United States Patent
Faram et al.

(10) Patent No.: US 12,424,862 B2
(45) Date of Patent: Sep. 23, 2025

(54) METHODS OF MANAGING THE POWER REQUIREMENTS OF OFF-GRID ASSEMBLIES AND OFF-GRID ASSEMBLIES EMPLOYING SUCH

(71) Applicant: Prolectric Services Ltd, Clevedon (GB)

(72) Inventors: Michael Guy Faram, Clevedon (GB); Owen William Pearson, Clevedon (GB); Timothy Charles Brookes, Clevedon (GB); Christopher Alan Williams, Clevedon (GB)

(73) Assignee: PROLECTRIC SERVICES LTD, North Somerset (GB)

( * ) Notice: Subject to any disclaimer, the term of this patent is extended or adjusted under 35 U.S.C. 154(b) by 107 days.

(21) Appl. No.: 18/027,452

(22) PCT Filed: Sep. 22, 2021

(86) PCT No.: PCT/EP2021/076115
§ 371 (c)(1),
(2) Date: Mar. 21, 2023

(87) PCT Pub. No.: WO2022/063855
PCT Pub. Date: Mar. 31, 2022

(65) Prior Publication Data
US 2023/0336012 A1    Oct. 19, 2023

(30) Foreign Application Priority Data

Sep. 22, 2020   (GB) ...................... 2014959

(51) Int. Cl.
*H02J 7/35*    (2006.01)
*H02J 3/00*    (2006.01)
(Continued)

(52) U.S. Cl.
CPC ............ *H02J 7/0048* (2020.01); *H02J 3/003* (2020.01); *H02J 3/004* (2020.01); *H02J 7/0071* (2020.01);
(Continued)

(58) Field of Classification Search
CPC .. H02J 3/003; H02J 3/004; H02J 3/144; H02J 3/381; H02J 7/0048; H02J 7/007;
(Continued)

(56) References Cited

U.S. PATENT DOCUMENTS

2009/0129067 A1*  5/2009  Fan ..................... F21V 23/0435
                                                     362/183
2010/0269383 A1* 10/2010  Nifenecker .......... H05B 45/325
                                                      40/541

(Continued)

FOREIGN PATENT DOCUMENTS

WO    2019/177621 A1    9/2019

OTHER PUBLICATIONS

International Search Report and Written Opinion for Application No. PCT/EP2021/076115, dated Dec. 10, 2021, 11 pages.

*Primary Examiner* — Levi Gannon
(74) *Attorney, Agent, or Firm* — McCarter & English, LLP; Jonathan C. Lovely

(57) ABSTRACT

The present invention relates to a method of managing the power requirements of an off-grid assembly, and in particular a solar powered off-grid floodlight assembly, that has one or more functional components with electrical power demands that are met by energy storage means. In a first stage the method determines the current state of charge of the energy storage means and records such. This current state of charge determined is then compared with a calculated power requirement for operating said functional components for at least one required operating period. The level
(Continued)

of power supplied by the energy storage means to the functional components is then managed in accordance with a power rationing model that comprises instructions to vary the power supplied over time to ensure at least partial functionality of the functional components throughout the required operating period or periods.

19 Claims, 13 Drawing Sheets

(51) Int. Cl.
    *H02J 7/00* (2006.01)
    *H05B 47/16* (2020.01)

(52) U.S. Cl.
    CPC .......... *H02J 7/007182* (2020.01); *H02J 7/35* (2013.01); *H05B 47/16* (2020.01)

(58) Field of Classification Search
    CPC ................ H02J 7/0071; H02J 7/00712; H02J 7/007182; H02J 7/35; H05B 47/16
    See application file for complete search history.

(56) References Cited

U.S. PATENT DOCUMENTS

| | | | |
|---|---|---|---|
| 2012/0143383 A1 | 6/2012 | Cooperrider et al. | |
| 2014/0142774 A1* | 5/2014 | Katayama | H02J 3/466 |
| | | | 700/291 |
| 2017/0231053 A1* | 8/2017 | Underwood | G06V 20/52 |
| 2018/0284194 A1 | 10/2018 | Andersson | |
| 2020/0091855 A1* | 3/2020 | Pevear | H02S 10/10 |
| 2021/0006069 A1* | 1/2021 | Zeng | H02J 3/14 |

\* cited by examiner

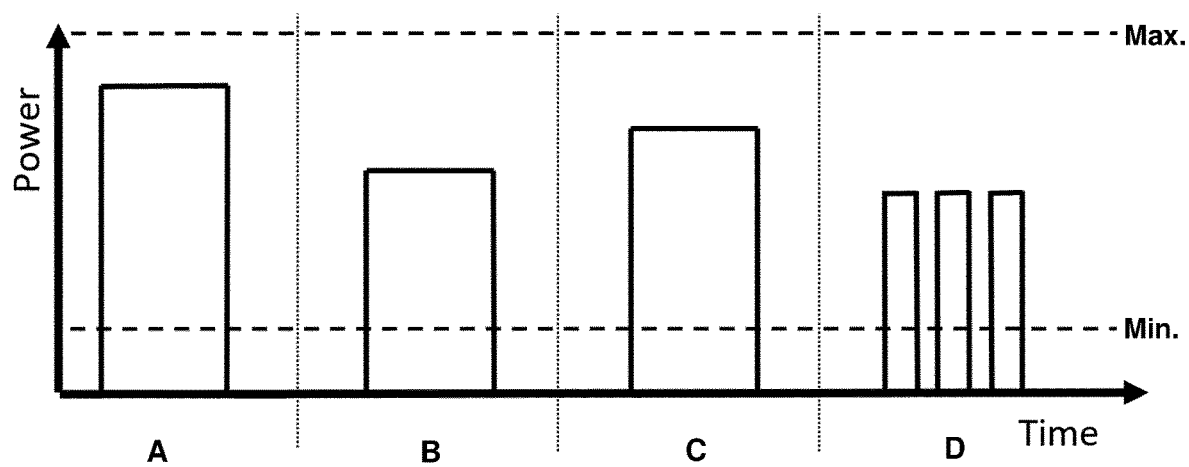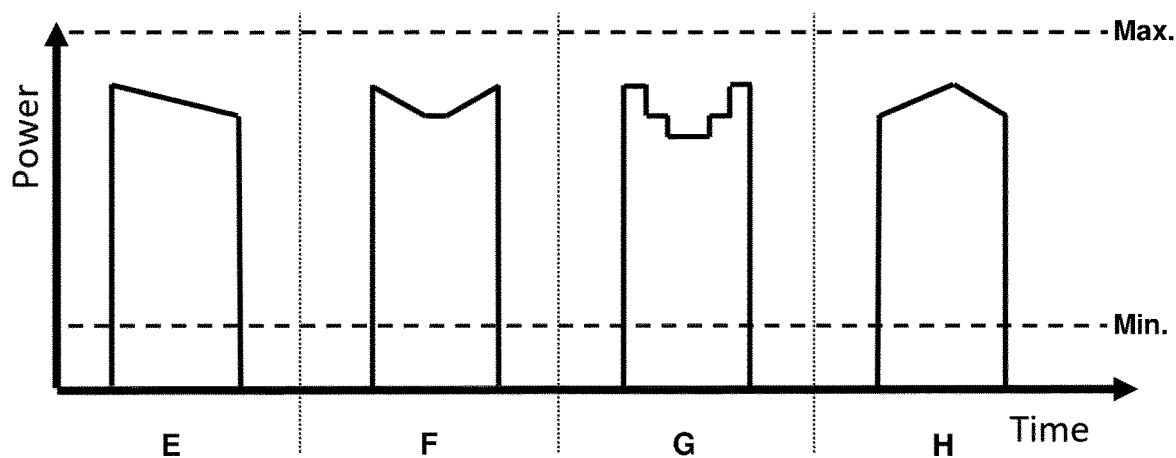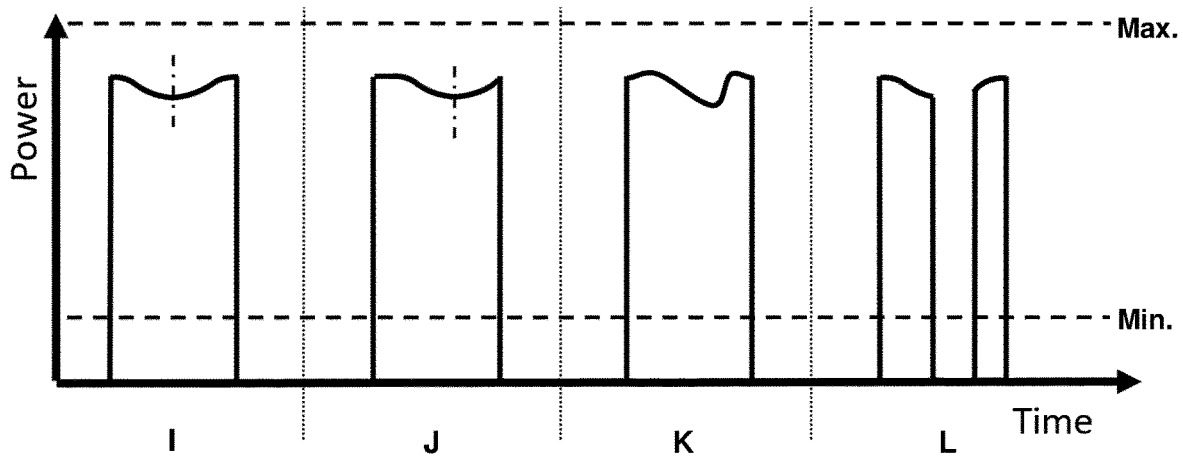
Fig. 5

| Asset | Last Seen | Battery Level | Battery Voltage | Customer | Location | Utility Status | Panel Status | Orientation | Runtime |
|---|---|---|---|---|---|---|---|---|---|
| Asset_1 | 3 mins ago | 85% | 28.8 | CustomerA | London | On (T) |  | 27° | 16 |
| Asset_2 | 5 mins ago | 10% | 26.0 | CustomerB | Madrid | On (T) |  | -150° | 17.8 |
| Asset_3 | 2 wks ago | 97% | 25.5 | CustomerC | Paris | Off |  | 0° | 19 |
| Asset_4 | 2 days ago | 100% | 26.2 | CustomerB | London | On (M) |  | 109° | 17.1 |
Fig. 10

METHODS OF MANAGING THE POWER REQUIREMENTS OF OFF-GRID ASSEMBLIES AND OFF-GRID ASSEMBLIES EMPLOYING SUCH

CROSS-REFERENCE TO RELATED APPLICATIONS

This application is a 35 U.S.C. § 371 national stage filing of International Application No. PCT/EP2021/076115, filed on Sep. 22, 2021, which claims priority from United Kingdom Application No. 2014959.7, filed on Sep. 22, 2020. The entire contents of each of the aforementioned applications are expressly incorporated herein by reference in their entirety as part of the disclosure of the present application.

FIELD OF THE INVENTION

The present invention relates to off-grid assemblies, such as floodlight assemblies, and methods of managing the power requirements of such.

BACKGROUND OF THE INVENTION

In situations where it is necessary to operate electrical equipment in the absence of a mains power supply, such as in remote or undeveloped locations, suitable off-grid assemblies can be deployed.

At their most basic these off-grid assemblies typically comprise one or more electrically powered functional components and an energy storage means to power said functional components.

Examples of functional components that can be incorporated into off-grid assemblies include: lighting and lighting towers; surveillance cameras; loudspeakers; sensors; display screens; and power offtake facilities. These various functional components can be used alone or in combination with one another to service a location in which mains power is not readily accessible.

More sophisticated assemblies also comprise an energy source that is operable to recharge the energy storage means.

Examples of energy sources that can be incorporated into off-grid assemblies include: solar photovoltaic arrays; internal combustion engine powered generators; fuel cells; wind turbines; and even other energy storage means. Once again these various energy sources can be used alone or in combination with one another to service a location in which mains power is not readily accessible.

One of the main challenges facing off-grid assemblies is the management of what is effectively a limited energy resource held by the energy storage means. This problem remains regardless of whether the off-grid assembly is provided with an energy source.

SUMMARY OF THE INVENTION

The present invention relates to methods of managing the power requirements of off-grid assemblies and in particular off-grid floodlight assemblies and yet more particularly off-grid floodlight assemblies with a solar photovoltaic energy source.

According to a first aspect of the present invention there is provided a method of managing the power requirements of an off-grid floodlight assembly that has one or more lighting modules powered by energy storage means, said method comprising: a) determining the current state of charge of the energy storage means and recording such, wherein the state of charge is determined by either; i) observing a stabilisation period following a change in charge supply and/or charge demand (load) experienced by the energy storage means before measuring the voltage and load power of the energy storage means and said light modules respectively and using the stabilised measurements taken to determine the state of charge of the energy storage means; or ii) using the difference between charge input and charge output of the energy storage means to calculate any change in the state of charge since the state of charge was last determined using stabilised measurements in accordance with step i) to determine the state of charge currently of the energy storage means; b) comparing the state of charge determined in step a) with a calculated power requirement for providing illumination over at least one required lighting period, wherein said required lighting period is determined taking into account the prevailing dawn and dusk times for the region in which the off-grid floodlight assembly is deployed; c) managing the level of power supplied by the energy storage means to the lighting modules in accordance with a power rationing model, wherein said power rationing model comprises instructions to vary the power supplied over time to ensure delivery of illumination throughout the required lighting period or periods.

The off-grid power management method of the present invention works by accurately measuring the current state of charge of the on-board energy storage means of the off-grid assembly and then using measured level to produce a power rationing model that ensures a minimum level of functionality is delivered by the on-board functional component(s), which in this aspect of the invention are lighting modules, for a predetermined period or periods (e.g. between dusk and dawn).

In some embodiments of the off-grid power management method, the operation of comparing the current state of charge with the calculated power requirement may be omitted. In such embodiments, the invention may comprise: determining the current state of charge of the energy storage means and recording such, where the state of charge is determined according to option i) or ii) above; and managing the level of power supplied by the energy storage means to the lighting modules in accordance with a power rationing model, wherein said power rationing model comprises instructions to vary the power supplied over time to ensure delivery of illumination throughout at least one required lighting period.

In its broadest sense the term 'on-board' is intended to cover components that are either integrated into a single fixed off-grid assembly or components that take the form of individual modules that are assembled or connected together at the location where the off-grid assembly of the present invention is to be deployed.

It will be appreciated that, in use, off-grid floodlight assemblies will mainly be required to operate during periods of low light, and typically between dusk, when a required lighting period would begin, and dawn, when the required lighting period would end. While this is one particular example of how a required lighting period may be defined, it will be appreciated that, in general, a 'required lighting period' refers to the period of time during which illumination (e.g. by a lighting module of the off-grid floodlight assembly) is required at the location of the off-grid floodlight assembly. This may be between dusk and dawn but may otherwise be when lighting is low (for example, during inclement weather or when the off-grid floodlight assembly is in an enclosed space such as a building, tunnel, or shaft). Alternatively, the required lighting period may be the period from when the off-grid floodlight assembly is deployed at a given location until when the off-grid floodlight assembly requires charging (e.g. when a charge level in the energy storage means drops to a particular threshold).

It is envisioned that, although a single lighting period may be employed, in some embodiments multiple lighting periods may be employed.

In conventional equipment the activation of the lighting modules is typically controlled through a simple on-off switch or may be controlled through the use of photo (light) sensors. In more sophisticated equipment, programmable timed on-off controls may be provided.

However, all of these approaches have the weakness that they can allow lights to come on or remain on during the daytime when they are not needed, thereby consuming energy unnecessarily.

On-off switches require human intervention and can be inadvertently left on. Programmable timers may be set incorrectly or may be set correctly for the current day but will become incorrect as dawn and dusk times shift, or due to daylight saving time changes, without human intervention. Photo sensors can activate when covered or dirty or can deactivate when exposed to direct light.

It will be appreciated that despite these disadvantages the above approaches still provide a practical solution for floodlight assemblies that are connected to unrestricted power supply (i.e. mains power).

However the impact of above identified disadvantages is much more pronounced in off-grid floodlight assemblies where there are limits on the power supply because the on-board energy storage means may not have the required charge to keep the lights on until they are turned off again (i.e. either manually or automatically by a timer or a sensor). Ultimately, in these circumstances, the off-grid assembly does not perform its primary function.

By managing the operation of the off-grid assembly's lighting modules in accordance with a power rationing model that takes into account the charge levels of the on-board energy storage means the method of the present invention ensures that the off-grid floodlight assembly performs its primary function (i.e. to provide illumination throughout the periods that the operator requires it).

It will be appreciated that the effectiveness of any power rationing model relies on the ability to accurately measure the current level of charge held by the energy storage means; that is to say its current state of charge. Without an accurate reading of the total charge available there is no way of knowing how much energy there is to ration across the required lighting period or periods.

There are numerous different types of commercially available energy storage means (e.g. batteries, accumulators, capacitors, supercapacitors, fuel cells), which, depending on their chemical or physical parameters, have different discharge signatures. This calls for different methods for assessing the battery state of charge, defined as the ratio or percentage of charge held versus the total charge capacity. It will be appreciated that use of the term 'battery' herein is intended to refer to 'energy storage means' in general and other examples besides a battery are contemplated. In general, an energy storage means as discussed herein refers to any device, apparatus, or system capable of storing potential energy for subsequent conversion to electrical energy. The energy storage means may be charged, to increase the potential energy stored therein, and discharged, to decrease the potential energy stored therein.

In one well known approach voltage is used as an indicator of state of charge. This approach is commonly used due to its simplicity and accurate measurements. With that said, when using this approach it is generally recommended that measurements should follow a period of stabilisation, also referred to as resting, during which no charge or discharge is applied, and under stabilised temperature conditions. As used herein, the term 'stable' refers to a lack of measurable change in a parameter (e.g. voltage) in a given period of time. In other words, a parameter is said to be stable when it is substantially constant in a given period of time. For example, a voltage across an energy storage means will change when the energy storage means experiences a change in charge supply, charge demand, and/or temperature (e.g. when the energy storage means begins or finishes charging, discharging, or changing temperature). However, after a certain period of time from when the change occurs the voltage will stabilise (e.g. remain constant) until there is a further change in charge supply, charge demand, or temperature. Equivalent meaning is intended by the terms 'stabilised', and 'stabilisation'. For example, a stabilisation period refers to a period of time in which a parameter (e.g. voltage) is substantially constant. It will be appreciated that minor instabilities (e.g. due to noise) may still occur during a period of otherwise stable voltage.

The reason that it is generally recommended that measurements should follow a period of stabilisation is because applied charge, discharge and temperature have the effect of changing voltage levels in a way that is regarded as being unpredictable, and that it is perceived will therefore produce an unreliable correlation with state of charge. Typically the period required for a battery to fully stabilise may be between 4 and 24 hours depending on the battery type, leading to the perception that this approach is impractical in most applications where the state of charge of an energy storage means is being monitored in-situ (e.g. where the battery is installed in an operational assembly).

Another known approach for measuring the state of charge of a battery is to measure charge or energy entering and leaving the battery, whether in Coulombs (Amp-Seconds), Amp-Hours, or the derivative, Watt-Hours.

This approach relies on periodic recalibration against a known state of charge condition, for example, when the voltage has reached a stabilised condition such as reaching a maximum value during charging and remaining in such condition for a period of time or until such time as the corresponding current has levelled off to a minimum value, or when the voltage is at or has reached a threshold value at a high or low state of charge.

This recalibration stage is important, to account for the accumulation of errors in charge entry and exit measurements, that can result in an incorrect assessment of the state of charge. This approach is most commonly applied to batteries that produce a relatively constant or only slightly changing voltage at states of charge across the majority of their operating range (e.g. lithium-based batteries). With batteries of this type the voltage based approach is less common and is limited to use nearing the extremities of charge status.

In contrast to lithium-based batteries, lead-acid based batteries typically exhibit a more pronounced variation of voltage with state of charge, as a result the voltage approach is more applicable.

However, with that said and as noted above, lead-acid based batteries tend to have longer stabilisation periods and experience greater changes in voltage due to applied charge, discharge and temperature, leading to a common perception that the accurate measurement of the charge status of lead-acid based batteries in an in-situ situation is difficult to achieve. As such, charge entry and exit measurement techniques are also applied to lead-acid batteries, also with a preference towards using recalibration at known charge conditions such as nearing fully charged or fully discharged.

In practice, voltage based calibration is preferably applied under the nearing fully charged or fully charged condition, where the voltage tends to plateau in combination with the levelling off of current to a minimum value during charging, or where the voltage is at or reaches a threshold value when no charge or load is applied. The nearing fully discharged or fully discharged condition is more difficult to identify, since a battery approaching fully discharged will tend to exhibit a more steeply declining, rather than plateauing voltage, and so a threshold value is typically applied to detect this state.

In illustration of the above concepts, reference is now made to FIG. 1, which shows a graph representing how voltage measurements from a battery might vary over time, as different conditions are applied. This graph, which assumes stabilised battery temperature, generally represents the behaviour of a lead-acid based battery.

Referring now to FIG. 1, in zone 1 there is no charge or discharge because the battery has no load placed on it and is also not receiving charge from an energy source.

Following the application of a load the curve moves into zone 2, wherein there is a sharp suppression of the voltage followed by a period of stabilisation to a new condition. It will be appreciated that the degree of suppression will depend on the level of the load applied (e.g. higher load causes more suppression) and also the state of charge level.

Zone 3 represents the new condition, in which the voltage steadily decreases as the state of charge reduces subject to the continued presence of the load. Following the removal of the load the curve moves into zone 4.

In zone 4, with the load removed, there is an elevation in the voltage followed by a stabilisation period that leads to zone 5. In zone 5, as with zone 1, there is no load or charge placed on the battery and thus voltage is essentially constant.

Following the application of a charge (which may be modulated by the charging apparatus), the curve moves to zone 6, in which there is a sharp elevation of the voltage followed by a period of stabilisation to a new condition. Again It will be appreciated that the degree of elevation will depend on the level of the charge applied (e.g. higher charge causes more elevation) and also the state of charge level.

Zone 7 represents the new condition in which the voltage increases in a controlled manner due to the application of a controlled charge until a maximum value is achieved at 8. The rate of elevation will depend on the level of the charge applied. In zone 8, the charge current (not shown) reduces and levels off to a minimum stabilisation value when the battery is fully charged. It should also be noted that in situations where the charge is not consistent, such as is the case with solar photovoltaic array energy sources, full stabilisation may only be achieved once the battery is fully charged.

Following the removal of the charge the curve moves to zone 9, in which there is a sharp suppression of the voltage followed by a period of stabilisation to a new condition in zone 10. In zone 10, as with zones 1 and 5, the voltage is essentially constant because the battery has neither a load nor a charge associated with it. This voltage corresponds to a threshold value denoting fully charged status.

FIG. 2 illustrates the relationship between battery voltage and state of charge for a lead-acid based battery. The graph of FIG. 2 shows an increase in battery voltage as the state of charge increases. It will be appreciated that for batteries with different chemistries, such as lithium-based, a more vertical profile might be expected in the region between nearing fully discharged and nearing fully charged.

Turning now to FIG. 2, it will be appreciated how, in view of the conditions explained with reference to FIG. 1, the voltage at any state of charge can span a range, depending on the specific conditions.

In FIG. 2, the range of uncertainty between a lower voltage curve 11, which represents the load suppressed voltage, and an upper voltage curve 12, which represents the charge elevated voltage, is represented by the area 13.

Curve 14 denotes a section of the relationship between a stabilised voltage with no load or charge applied, and where the voltage has stabilised (shown over a range of stabilised voltage conditions). This curve corresponds to zones 1, 5 and 10 shown in FIG. 1.

It will be appreciated from FIG. 2 that the use of a single curve calibration between voltage and state of charge has the potential to result in significant errors in measurement of state of charge when applied in operational (i.e. in-situ) conditions. That is to say, during the operation of an off-grid assembly where a load or a charge may be applied to the energy storage means/battery. It is noted that other conditions, such as temperature, may also introduce errors too.

For example, if curve 14 were to be used to assess the state of charge under a load condition, the state of charge would be underestimated. Conversely, if curve 14 were to be used to assess the state of charge under a charge condition, the state of charge would be overestimated.

Batteries are applied in many different applications. In most situations, the level, frequency and duration of load or charge is dictated by the user and the application and is therefore highly unpredictable.

In the context of a photovoltaic array charged battery system (other than at fully charged status), the level of charge is particularly unpredictable since this will depend on intra-day weather patterns, which, combined with intermittent load application, which may occur at the same or different times to the charge application, will result in a highly variable relationship between voltage and state of charge, for example, as conceptually illustrated in curve section 15 over an initial intermittent variable charging period and a subsequent intermittent variable load period.

For the above reasons at least, battery state of charge measurement in operational assemblies, such as off-grid assemblies, is challenging and particularly difficult to achieve using voltage as an indicator because it can only reliably be collected under limited circumstances (i.e. when the battery is not subject to either a load or a charge) which may rarely occur in an operating assembly.

With a view to achieving more accurate state of charge measurements for the on-board energy storage means of an off-grid assembly, the inventors have developed an approach that uses a hybrid battery state of charge approach that allows the state of charge to be determined in a broader range of circumstances.

In this regard the hybrid battery state of charge approach uses a combination of a voltage measurement taken from the battery and a power load measurement taken from the functional component (e.g. lighting module) that is powered by the battery.

In the method of the invention, load power is controlled and regulated in terms of its level and duration, and as such, has a behaviour that is known or can be predicted. In this context, it has been found that the relationship between voltage and state of charge under prevailing environmental conditions can be understood, particularly within specific envelopes of equipment operation.

It is also appreciated that in situations where the on-board energy storage means/batteries of the off-grid assembly receives a charge from a known constant or controlled energy source (e.g. an inverter regulated supply from a generator) its impact on the relationship between voltage and state of charge can also be taken into account.

With that said, in the case of the solar powered off-grid assembly embodiments of the present invention, this is not possible and measurements can only be collected when no charge is being received from the solar photovoltaic array (e.g. at night). However even with this restriction, the approach employed by the method of the present invention still provides an increased window in which to determine the state of charge of the assembly's energy storage means/batteries.

By way of further explanation and referring to FIG. 2 by way of example, in a condition where no charge is being applied but a constant or known load is being applied, and where the known load is stabilised, it has been found that, despite perceptions of what can be achieved, models can be developed to produce accurate predictions of state of charge from voltage under different conditions.

In this regard, curve 16 in FIG. 2 illustrates a possible load-condition relationship between voltage and state of charge over a period of time, whereas curve 17 shows a corresponding situation in which a controlled and known charge is applied over a period of time.

It is envisioned that this principle can be applied across a range of load scenarios, provided conditions are controlled or can be predicted. In this way the approach employed by the method of the present invention allows recalibration of the state of charge of a battery using the voltage and knowledge of the load status, that is accurate at all states of charge, and not just at states of charge nearing fully charged or fully discharged.

This is particularly relevant in the context of the invention where the state of charge is likely to fluctuate over time but may only intermittently reach a condition of nearing fully charged or fully discharged. In particular, the condition of fully charged, which is the most readily measured condition using existing methods, will occur most infrequently during the seasonal or environmental conditions under which the invention offers most value.

In the light of the described deficiencies of the two above approaches, the method of the first aspect of the present invention therefore employs a twin approach to determine the charge held by the energy storage means at any given time by switching being the hybrid battery state of charge approach and the charge in/charge out approach (sometimes referred to as Coulomb counting).

In accordance with the twin approach employed by the method of the first aspect of the present invention, during times when the energy storage means is under stable conditions the state of charge will be determined using the voltage of the energy storage means and load power of the lighting module(s) (i.e. the functional component of the assembly). However, in between these stabilised periods the charge level will be determined using the difference between charge input and charge output of the energy storage means and the last state of charge determined using the hybrid battery state of charge approach.

It is envisaged that, in practical execution, to ensure sufficient voltage stabilisation occurs following a charging period, the voltage method may preferably be applied between midnight and dawn, or more preferably, within two hours before dawn and during a stabilised period, whether with load applied, or no load applied, allowing a stabilisation period of between 10 and 30 minutes after a load is applied, and between 30 minutes and two hours after a load is removed.

The inventors have discovered that this twin approach, and in particular the use of the hybrid state of charge approach, is particularly suitable for use in off-grid assemblies (such as off-grid floodlight assemblies) because of the relatively small suppressive impact caused by the power load of the functional components (e.g. lighting modules) that tend to be employed.

As noted above, off-grid assemblies are generally designed to provide a service or function over an extended period and across dispersed and sometimes hard to access locations. For this reason, the on-board energy storage means (e.g. battery bank) and the functional components (e.g. lighting modules) are typically specified such that when combined, the rate of charge and power demand is low compared to maximum rated rates and levels for the types of batteries used. This arrangement is employed with the objective of maximising the achievable period of autonomous functional delivery and minimising or eliminating the need for manual intervention.

For example, a battery bank specified to provide functional operation of an off-grid assembly over a period of up to 300 hours may, in a non-off-grid application, attend to a significantly higher power requirement, under which condition, in the absence of ready access to recharging inputs, may provide service for a period of 12 hours or less. For an off-grid assembly, operating at a low discharge rate presents the additional opportunity that energy losses, for example due to internal resistance and heat losses, are minimised, allowing stored energy to be utilised more efficiently.

It has also been found that at low discharge rates and corresponding power demands of functional components, the period required for battery stabilisation can be relatively short compared to what may normally be expected for typical battery applications. Furthermore, under a stabilised load condition, subsequent small (incremental) variations in load level can result in a very quick re-achievement of stabilised conditions.

As such, near real-time measurement of battery state of charge can be achieved in such situations, which serves to increase the window of opportunity for determining the state of charge using the voltage method.

By increasing the frequency with which the state of charge of the off-grid assembly can be determined using the voltage approach, the method allows for more accurate readings of the state of charge, which in turn facilitate the formulation of better power rationing models that make full use of the charge held by the energy storage means.

In this regard it is appreciated that the power management instructions of the power rationing model employed in the method of the first aspect of the present invention may ensure that illumination is provided throughout the required lighting period by applying a blanket reduction to the power supply for the duration of the period.

In this way a constant reduced illumination level may be delivered throughout the required lighting period or periods (e.g. see profiles A-D in FIG. 5). However, it is considered preferable to employ more sophisticated power management instructions In one preferred approach the power management instructions of the power rationing model may be pre-programmed to increase and decrease the brightness of the light provided by the lighting modules at pre-determined points during the required lighting period (e.g. see profiles E-H in FIG. 5).

The facility to pre-program times during the required lighting period when lighting is more critical than others gives greater flexibility because it allows increased energy savings to be made during periods when maximum illumination is less critical. This energy savings can in turn be used to increase illumination levels in periods when maximum illumination is critical.

The pre-determined points may comprise pre-programmed times as described above. Additionally or alternatively, the pre-determined points may comprise one or more trigger conditions being satisfied during the required operating period. In other words, the power management instructions of the power rationing model may be configured to increase and/or decrease the functionality of the functional components responsive to determining that one or more trigger conditions are satisfied during the required operating period or periods.

In such embodiments, a method of managing the power requirements of an off-grid assembly that has one or more functional components with electrical power demands that are met by energy storage means may further comprise monitoring one or more trigger conditions of the functional components and/or the energy storage means. The method may further comprise increasing and/or decreasing the functionality of the functional components responsive to detecting that the one or more trigger conditions are satisfied.

Increasing and/or decreasing functionality may comprise: increasing and/or decreasing the power supplied by the energy storage means to the functional components during the required operating period(s); and/or activating and/or deactivating the functional components during the required operating period(s).

The one or more trigger conditions may comprise: a current state of charge of the energy storage means dropping below a threshold charge level; a prioritised functional component being operated; and/or the functional component has not been operated within a predefined period.

The threshold charge level may be determined based on a minimum duration for which a prioritised functional component must operate. For example, the threshold charge level may be chosen such that the energy storage means has sufficient charge to power the prioritised functional component for the minimum duration. The prioritised functional component may be the at least one lighting module. The threshold charge level may be chosen such that the energy storage means has sufficient charge to power the at least one lighting module for a certain number of nights.

By 'a prioritised functional component' it is meant that the ability to operate the prioritised functional component is considered more important than the ability to operate other functional components that are not prioritised. The prioritised functional component may be, for example, the at least one lighting module. It may be advantageous to ensure that the lighting modules can be operated over operating other functional components, such as a power offtake facility.

In this context, it is specifically contemplated that the other functional components (i.e. those functional components that are not prioritised) may comprise the at least one power offtake facility. The inventors have appreciated that lighting modules are typically highly efficient (for example, when the lighting modules comprise light emitting diodes (LEDs)) and so may use approximately 10-100 W of power per lighting module. In contrast, tools that may be secured to a power offtake facility (e.g. power tools) can require as much as 100-1000 W of power. Therefore, in operating environments in which providing lighting is important, it is particularly advantageous to operate the lighting module in preference to the power offtake facility.

The predefined period may be measured from the last time the functional component was operated. The predefined period may be a certain number of minutes, hours, or days from the last time the functional component was operated.

The power offtake facility may comprise an inverter. The inverter may be controlled by a controller. The power offtake facility may further comprise a switch to operate the power offtake facility. The switch may comprise a momentary switch (in contrast to a latching switch). In other words, the switch is configured to, upon actuation, cause an instruction (e.g. an electrical pulse) to be transmitted to the controller which, in turn, causes the controller to activate the inverter and provide power to the power offtake facility. The power may be provided to the power offtake facility until such time the switch is actuated again. Advantageously, such an arrangement ensures that is no mechanical relationship between the position of the switch and the activation of the inverter. In other words, the controller and/or the inverter may be controlled remotely, without the need to physically actuate the switch (e.g. if the power offtake facility is inadvertently left in an activated state).

Additionally or alternatively the power management instructions of the power rationing model may be calculated with reference to the prevailing dawn and dusk times for the region in which the off-grid floodlight assembly is deployed. It will be understood that 'prevailing' dusk and dawn times refer to the times of sunset and sunrise, respectively, that are determined for a particular region (e.g. the region in which the off-grid assembly is deployed) based on the time of year and the geographical location (e.g. latitude and longitude) of the particular region.

It is envisaged that the dawn and dusk times for the region in which the off-grid floodlight assembly is deployed could be manually supplied by an operator or they could be automatically retrieved by the assembly from a data source. In both situations the method may include the step of determining the current geographical location of the assembly, preferably by way of reference to GPS technology.

It is envisioned therefore that the power rationing model may be pre-programmed, calculated with reference to the prevailing dawn and dusk times for the region in which the assembly is deployed, or even a combination of both.

However regardless of which approach is employed it is considered preferable that the power management instructions comprise a power supply profile with a bell curve shaped distribution, wherein preferably the bell curve is inverted so that the power supplied during the required lighting period initially falls before rising again (e.g. see profiles I-L in FIG. 5).

Further preferably the extremum of the bell curve: a) corresponds to a temporal midpoint between the prevailing dawn and dusk times for the region in which the off-grid floodlight assembly is deployed; or b) is offset from the temporal midpoint between the prevailing dawn and dusk times for the region in which the off-grid floodlight assembly is deployed.

It will be appreciated that the extremum of the bell curve represents the peak of a normal bell curve distribution and the trough of an inverted bell curve distribution. In terms of the power supply profile, therefore, the extremum can represent either the maximum or the minimum power supply level provided during the required lighting period.

Preferably the power rationing model may utilise historical electrical charge levels collected from the energy storage means to identity charge trends that can be used to help modulate the level of power supplied to the light modules during the required lighting period.

It is envisaged that recent trends (e.g. gradient over time) of battery charge status can be used to inform light power adjustments. This can be applied by capturing a daily battery charge status value corresponding to a specific characteristic such as the lowest battery charge level of each day (or night), as may be given by the battery charge level at the last moment in the morning before the lights deactivate after a night of operation.

By capturing multiple measurements over several days, the gradient of battery charge level over time (increase or decrease) can be calculated. This gradient can be used to determine whether the power rationing model needs to be adjusted to decrease or increase illumination levels or maintained at the same illumination level.

It is further envisioned that the level of these adjustments may preferably take into account the charge levels of the energy storage means. That is to say, when energy storage means is less than half charged, the extent of adjustment may be larger than when the charge level is higher.

It is envisioned that the method of the first aspect can be employed for a range of energy storage means (e.g. lead acid, lead carbon, lithium ion batteries) regardless of the energy sources used to recharge them.

With that said, in a second aspect of the present invention there is provided a method of managing the power requirements of a solar powered off-grid floodlight assembly that has one or more lighting modules powered by energy storage means that is recharged by a photovoltaic array.

Conventional solar charged off-grid floodlight assemblies have historically been designed to capitalise on opportunities in regions where solar irradiance levels, lighting power and energy demands and equipment costs balance, to present a commercially viable solution.

However, in regions distanced from the equator, additional technical challenges are faced, including that night lengths during the winter are longer, denoting potentially longer lighting period requirements, day lengths during the winter are shorter, denoting reduced energy generation times, solar irradiance levels are lower due to a higher angle of incidence of the sun, and the degree of cloud cover is often higher, preventing solar irradiance from reaching the earth's surface.

These factors all compound to present obstacles to the effective and efficient use of solar charged off-grid floodlight assemblies in regions distanced from the equator, and in turn, to their technical feasibility and resulting economic and commercial viability.

In view of this, and in addition to employing the steps of the power management method of the first aspect as described above, the method of the second aspect also employs additional method steps that address the interaction between the off-grid floodlight assembly and its solar photovoltaic array energy source.

With this in mind the method of the second aspect further involves the power rationing model utilising historical solar irradiance data for the region in which the solar powered off-grid floodlight assembly is deployed to identity charge trends that can be used to help modulate the level of power supplied to the light modules during the required lighting period. It is envisioned that the data can either be used directly or it can be used to produce suitable models of historical solar irradiance.

High resolution measured historical solar irradiance data is available for most world regions. This data is generally used for the purpose of assessing the viability of proposed fixed solar power installations. It provides information that can be combined with details of solar panel ratings, angle, orientation, time of the year and location to provide an assessment of how much solar power could have been generated if an installation had been in place over the data capture period. This is used as a guide as to what might be expected in the future.

It will be appreciated that by employing the historical solar irradiance data for the region in which the off-grid floodlight assembly is deployed, it is possible to adjust the power rationing profile to take into account the predicted level of charge the on-board energy storage means is likely to receive in the future.

For example, if the predicted level of charge to be captured using the solar photovoltaic array is low the power rationing profile can be adjusted in anticipation of the energy storage means having a reduced level of charge available to deliver illumination for the duration of the required lighting period.

Preferably the power rationing model may utilise forecast weather and/or solar irradiance data for the region in which the solar powered off-grid floodlight assembly is deployed to identity charge trends that can be used to help modulate the level of power supplied to the light modules during the required lighting period.

It is envisioned that taking into account forecast weather and/or solar irradiance data for the local region can further improve the accuracy of the anticipated level of charge that the energy storage means will receive from the solar photovoltaic array, which will inform adjustments to the power rationing profile that optimise the operation of the off-grid floodlight assembly.

Preferably the power rationing model may utilise data regarding the operational status of the solar photovoltaic array, wherein the data is selected from the group consisting of: solar panel efficiency; exposed solar capture area of the solar array; elevation angle of panel; azimuth angle; and combinations thereof.

For example, if the solar photovoltaic array has a reduced operational status (e.g. the solar panel efficiency is low or the exposed solar capture area is less than the full available surface area of solar array) the maximum power supplied by the energy storage means may be limited.

Preferably the methods of both the first aspect and the second aspect of the present invention may further comprise retrieving the data required to manage the power requirements of the assembly from either an on-board memory system or from a remote memory system using a wireless network connection; and wherein the retrieved data consists of prevailing dawn/dusk times, historical electrical charge levels, historical solar irradiance levels, and combinations thereof.

Additionally or alternatively the methods of both the first aspect and the second aspect of the present invention may further comprise using a wireless network connection to retrieve forecast weather or solar irradiance data for the region in which the off-grid floodlight assembly is deployed.

Preferably the methods of both the first aspect and the second aspect of the present invention may further comprise setting a minimum level of illumination that is to be delivered throughout the required lighting period.

In this way the operator can set a floor level for the illumination below which the off-grid floodlight assembly is no longer fit for purpose.

Further preferably an alert may be issued when the determined state of charge of the energy storage means is insufficient to ensure delivery of the set minimum level of illumination throughout the required lighting period or periods. In this way the operator can take remedial action, possibly by providing supplementary charging, to keep the assembly operational.

One of the key benefits of the methods of the present invention is that it greatly reduces the level of operator interaction required for an off-grid floodlight assembly by allowing the assembly to adjust the power demands of the functional components (i.e. lighting modules) to suit the limits placed on the on-board energy storage means.

This is considered advantageous not least because off-grid floodlight assemblies are, by their very nature, deployed in remote locations. The ability to automate this power management process also reduces the burden on an operator when they have a fleet of assemblies out in the field at any one time.

With that said, on occasions even with the use of a power management method it may be impossible for an off-grid assembly to deliver illumination for the duration of a required lighting period. In such situations, anticipating this and issuing an appropriate alert will make the operator aware of the problem and will give them the chance to take pre-emptive action.

In a third aspect of the present invention there is provided an off-grid floodlight assembly, comprising one or more lighting modules, an energy storage means, and processing means configured to execute the steps of the methods of the either the first or the second aspects.

Preferably the off-grid floodlight assembly further comprises a solar photovoltaic array that is connected to the energy storage means so that solar energy can be used to charge the energy storage means.

Preferably the one or more lighting modules of the off-grid floodlight assembly may be mounted on a fixed, hydraulic, mechanical or manually raised vertical mast to enable the lighting modules to be positioned at elevation.

The first three aspects of the present invention all relate to the operation of an off-grid floodlight assembly. However it is envisaged that off-grid assemblies with a wider range of functional components can also benefit from the power management approach described above.

In view of this, a fourth aspect of the present invention provides a method of managing the power requirements of an off-grid assembly that has one or more functional components with electrical power demands that are met by energy storage means, said method comprising: a) determining the current state of charge of the energy storage means and recording such; b) comparing the state of charge determined in step a) with a calculated power requirement for operating said functional components for at least one required operating period; c) managing the level of power supplied by the energy storage means to the functional components in accordance with a power rationing model that comprises instructions to vary the power supplied over time to ensure at least partial functionality of the functional components throughout the required operating period or periods.

It will be appreciated that the above method provides the same benefits as detailed in relation to the off-grid floodlight assembly, albeit with regard to delivering a wider variety of functional outputs using an energy storage means with limited resource.

In some embodiments of the off-grid power management method, the operation of comparing the current state of charge with the calculated power requirement may be omitted. In such embodiments, the invention may comprise: determining the current state of charge of the energy storage means and recording such; and managing the level of power supplied by the energy storage means to the functional components in accordance with a power rationing model that comprises instructions to vary the power supplied over time to ensure at least partial functionality of the functional components throughout at least one required operating period.

In this regard it is envisioned that, provided their load power is stable and known, a variety of functional components could be provided on an off-grid assembly in accordance with this aspect of the present invention.

However, preferably the functional components are selected from a list that consists of: at least one lighting module; at least one surveillance camera; at least one loudspeaker; at least one sensor; at least one display screen; at least one power offtake facility; and combinations thereof.

Preferably the step of determining the current state of charge of the energy storage means comprises either: i) observing a stabilisation period following a change in charge supply and/or charge demand (i.e. load) experienced by the energy storage means before measuring the voltage and load power of the energy storage means and said functional components respectively and using the stabilised measurements taken to determine the state of charge of the energy storage means; or ii) using the difference between charge input and charge output of the energy storage means to calculate any change in the state of charge since the state of charge was last determined using stabilised measurements in accordance with step i) to determine the state of charge of the energy storage means.

The benefits of employing a twin approach to determining the charge level of the off-grid assembly are similar to those detailed above in relation to the first aspect of the present invention. As such, notwithstanding the possibility that the functional component being operated by the off-grid assembly may be different to the lighting modules employed in the off-grid floodlight assembly, the technical benefits described above are equally applicable to this aspect of the present invention.

Further, it is envisioned that all of the other preferred features identified in relation to the methods of the first and second aspects of the present invention are equally applicable to the method of this aspect of the present invention.

In a fifth aspect of the present invention there is provided an off-grid assembly, comprising one or more functional components, an energy storage means, and processing means adapted to execute the steps of the method of the fourth aspect of the present invention.

Preferably the functional components of the off-grid assembly are selected from a list that consists of: at least one lighting module; at least one surveillance camera; at least one loudspeaker; at least one sensor; at least one display screen; at least one power offtake facility; and combinations thereof.

Preferably the off-grid assembly further comprises an energy source configured to charge the energy storage means, said energy source selected from a list that consists of: a solar photovoltaic array; an internal combustion engine powered generator; fuel cells; a wind turbine; other energy storage means; and combinations thereof.

According to a sixth aspect of the present invention there is provided a computer program product comprising instructions which, when the program is executed by a computer, cause the computer to carry out the methods of the various aspects of the present invention.

It will be appreciated that any features, functions, and/or advantages described as applying to one of the aspects of the present invention may be correspondingly applied to any of the other aspects of the present invention.

BRIEF DESCRIPTION OF THE DRAWINGS

The various aspects of the present invention will now be described with reference to the drawings, wherein:

FIG. 5 shows various examples of power rationing profiles employed in the power management methods of the present invention;

FIG. 10 shows a view of a management portal provided to an external agent by the system of FIG. 9;

DETAILED DESCRIPTION

As described above, the method of managing the power requirements of an off-grid assembly can be used in assemblies with a variety of functional components. With that said, the power management method of the present invention is considered particularly beneficial for off-grid assemblies that have lighting modules as their main functional component. These types of off-grid assemblies are referred to throughout as floodlight assemblies; however it will be appreciate that any remotely deployed lighting rig will fall within the scope of the present invention.

Figure 1:
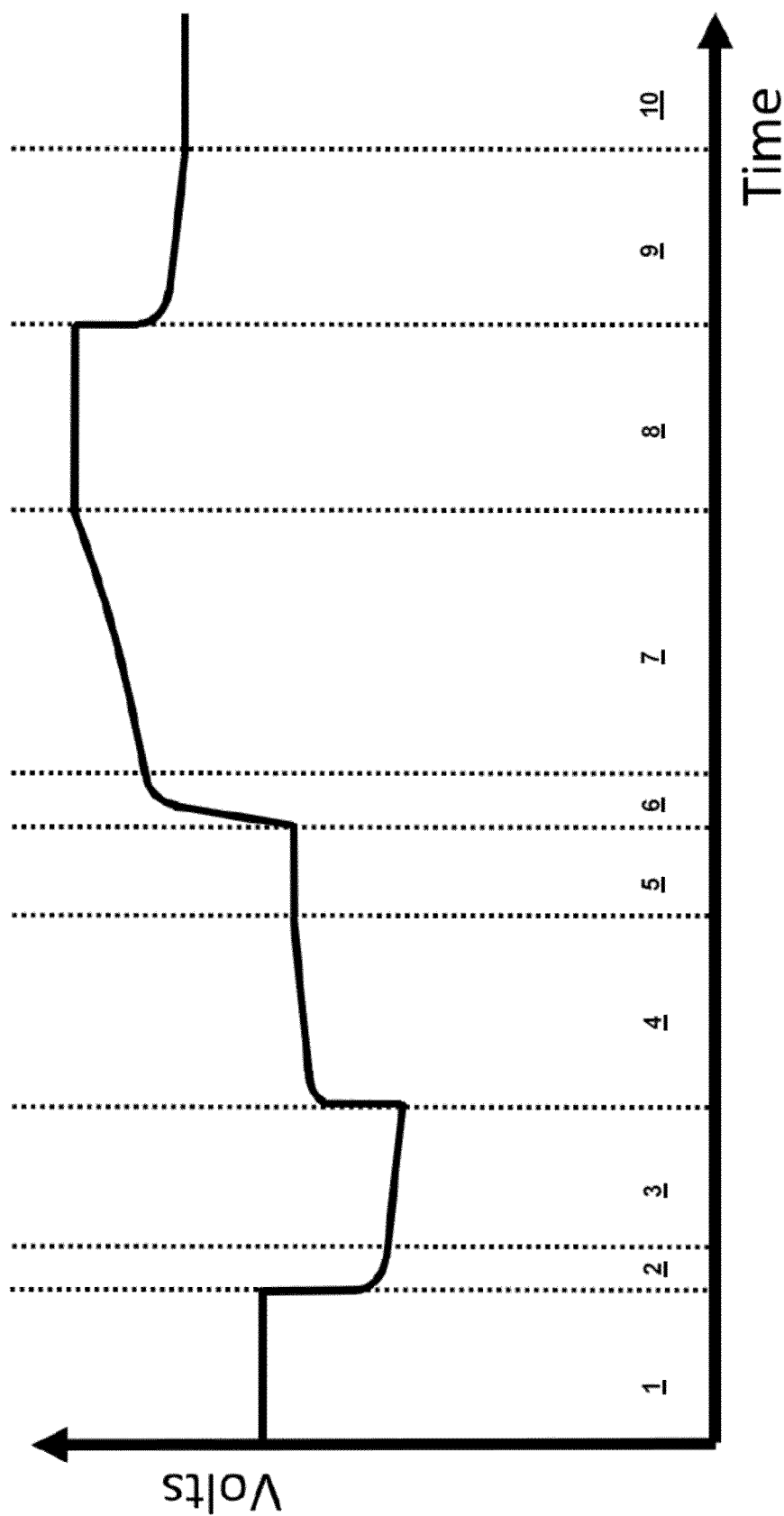
FIG. 1 shows a graph representing the voltage of an energy storage means over time for a lead-acid based battery.
Figure 2:
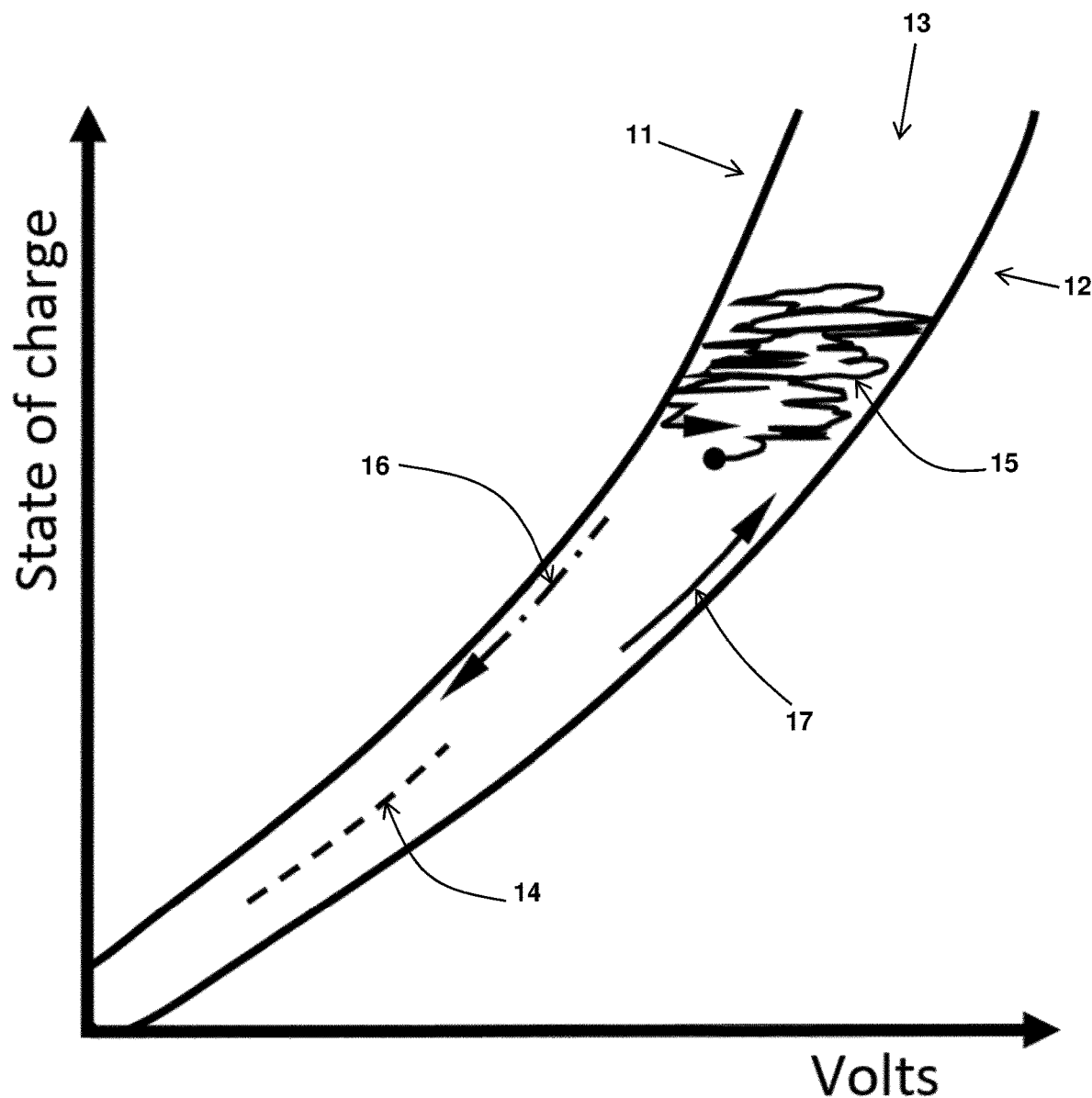
FIG. 2 shows a graph in which the state of charge of a lead-acid based battery is plotted against voltage.
Figure 3A:
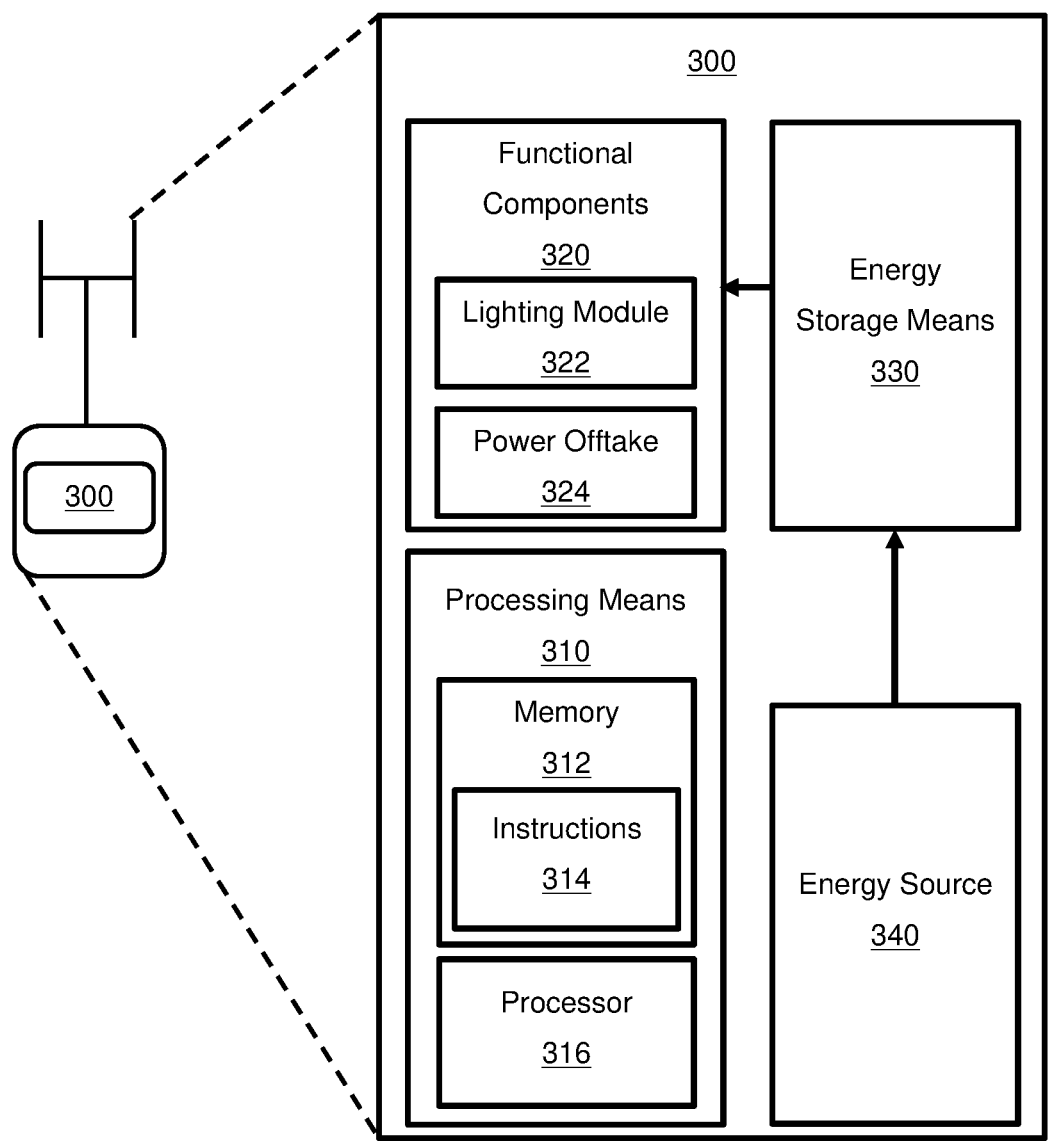
FIG. 3A is a schematic diagram of an off-grid floodlight assembly of the present invention.

FIG. 3A shows a schematic diagram of an off-grid floodlight assembly 300. The off-grid floodlight assembly comprises a processing means 310 and one or more functional components 320. The processing means 310 comprises a memory 312 and a processor 316, which is operably connected to the memory 312. The memory 312 comprises processor-executable instructions 314 that, when executed by the processor 316, causes the off-grid floodlight assembly 300 to perform any of the methods disclosed herein.

In the depicted example, the one or more functional components 320 comprise a lighting module 322 (e.g. a floodlight) and a power offtake facility 324. The lighting module 322 and the power offtake facility 324 are merely examples of possible functional components 320 and other possibilities are described herein. It will be appreciated that in embodiments in which the functional components 320 do not comprise a lighting module 322, the off-grid floodlight assembly 300 may simply be referred to as an off-grid assembly.

The off-grid floodlight assembly 300 further comprises an energy storage means 330 configured to store energy and supply energy to the one or more functional components 320.

The off-grid floodlight assembly 300 further comprises an energy source 340 configured to charge the energy storage means 330. Examples of energy sources 340 include: solar photovoltaic arrays; internal combustion engine powered generators; fuel cells; wind turbines; and even other energy storage means. Once again these various energy sources can be used alone or in combination with one another to service a location in which mains power is not readily accessible.

The off-grid floodlight assembly 300 may further comprise an energy controller that is configured to control the flow of energy, or charge, between the energy storage means 330, the energy source 340, and the functional components 320. More specifically, the energy controller may be configured to: receive energy or charge from the energy source; receive energy or charge from or provide energy or charge to the energy storage means; and/or provide energy or charge to the functional components. For example, the energy controller may be configured to receive energy or charge from the energy source and either provide it directly to the functional components or provide it to the energy storage means for storage. The energy controller may be further configured to receive energy or charge from the energy storage means and provide it directly to the functional components. Alternatively or additionally, some or all of functionality of the energy controller may be performed by the processing means 310. The energy controller may comprise a maximum power point tracker (MPPT) controller.

FIGS. 3B, 4, and 6-8 depict exemplary embodiments according to the present invention. It will be appreciated that the various combinations described with reference to these Figures may be combined in varying configurations. The embodiments in the following Figures are specific exemplary implementations of the more general arrangement described above with reference to FIG. 3A.

Figure 3B:
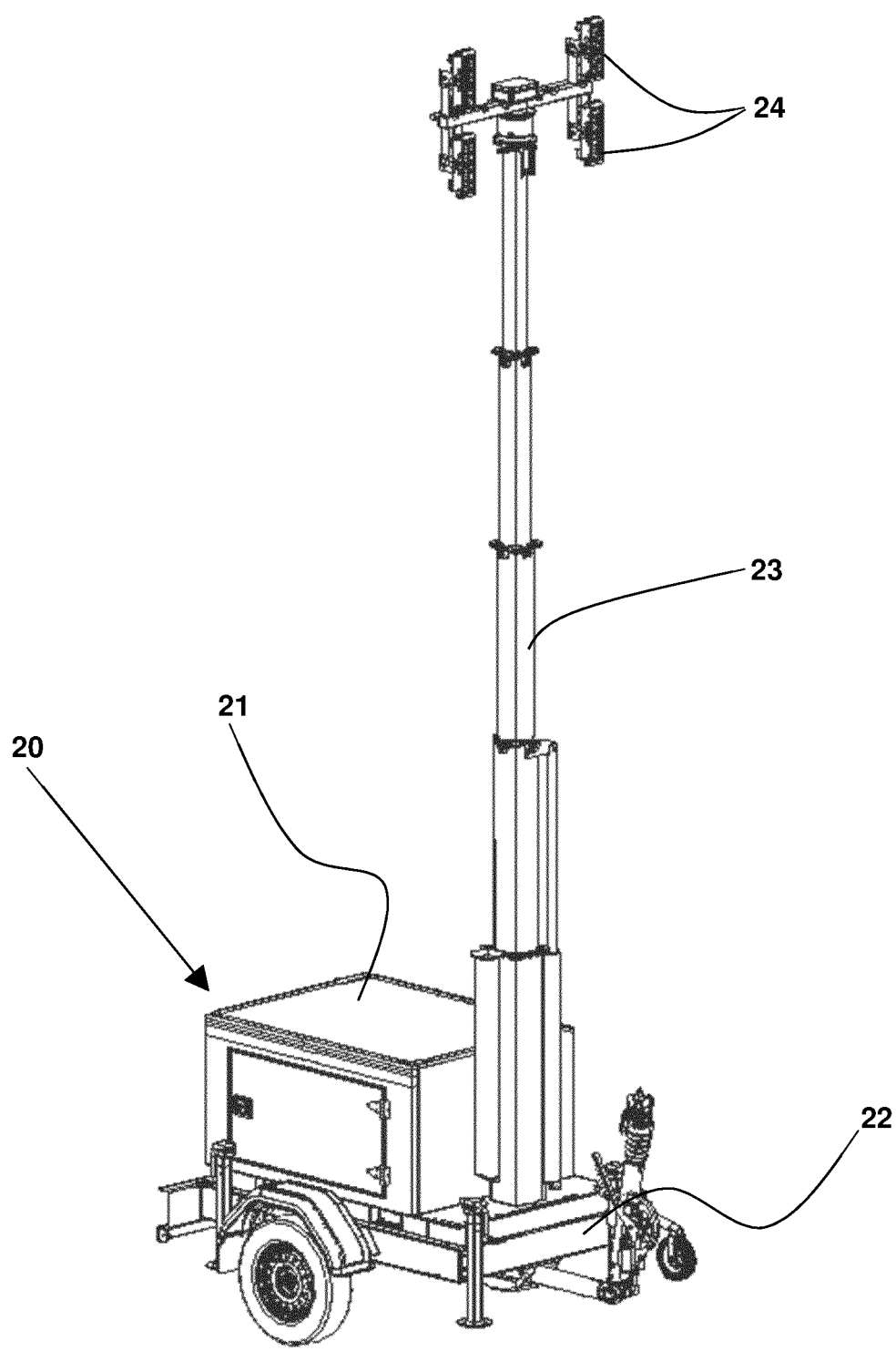
FIG. 3B shows a preferred embodiment of an off-grid floodlight assembly of the present invention.

FIG. 3B shows a preferred embodiment of an off-grid floodlight assembly according to the present invention. The assembly 20 comprises a battery housing 21 mounted on a trailer 22. Employing a trailer 22 enables the assembly to be easily transported and deployed to remote locations. With that said, it is envisaged that smaller, more light weight embodiments of the off-grid assembly of the present invention may not need to be mounted on a trailer.

In order to maximise the lighting effect provided by the assembly 20, the lighting modules 24 are attached to a mast 23, which can be extended and retracted as required to enable easy transport and storage during non-use.

Although not shown in FIG. 3B, it should be appreciated that preferably the battery housing 21 also houses, or has attached to it, the processing means that execute the steps of the power management method of the present invention.

It will be appreciated that the assembly shown in FIG. 3B is not shown with a permanently connected power source for recharging the on-board batteries within the battery housing 21. In the light of this it is envisioned that the assembly 20 is provided with a power input that allows a separate energy source to be periodically hooked up to the assembly to recharge the on-board batteries. Examples of suitable energy sources include: a solar photovoltaic array; an internal combustion engine powered generator; fuel cells; a wind turbine; other energy storage means; and combinations thereof.

Alternatively, such energy sources may be integral to the assembly and be either permanently attached to the assembly during operation or contained within battery housing 21. As such, in a further preferred embodiment of the present invention the off-grid assembly is provided a permanently connected solar photovoltaic array. Other preferred embodiments may provide an energy source in the form of an internal combustion generator or a fuel cell. As with the solar PV array these energy sources could be integrated or provided as a separate module.

Figure 4:
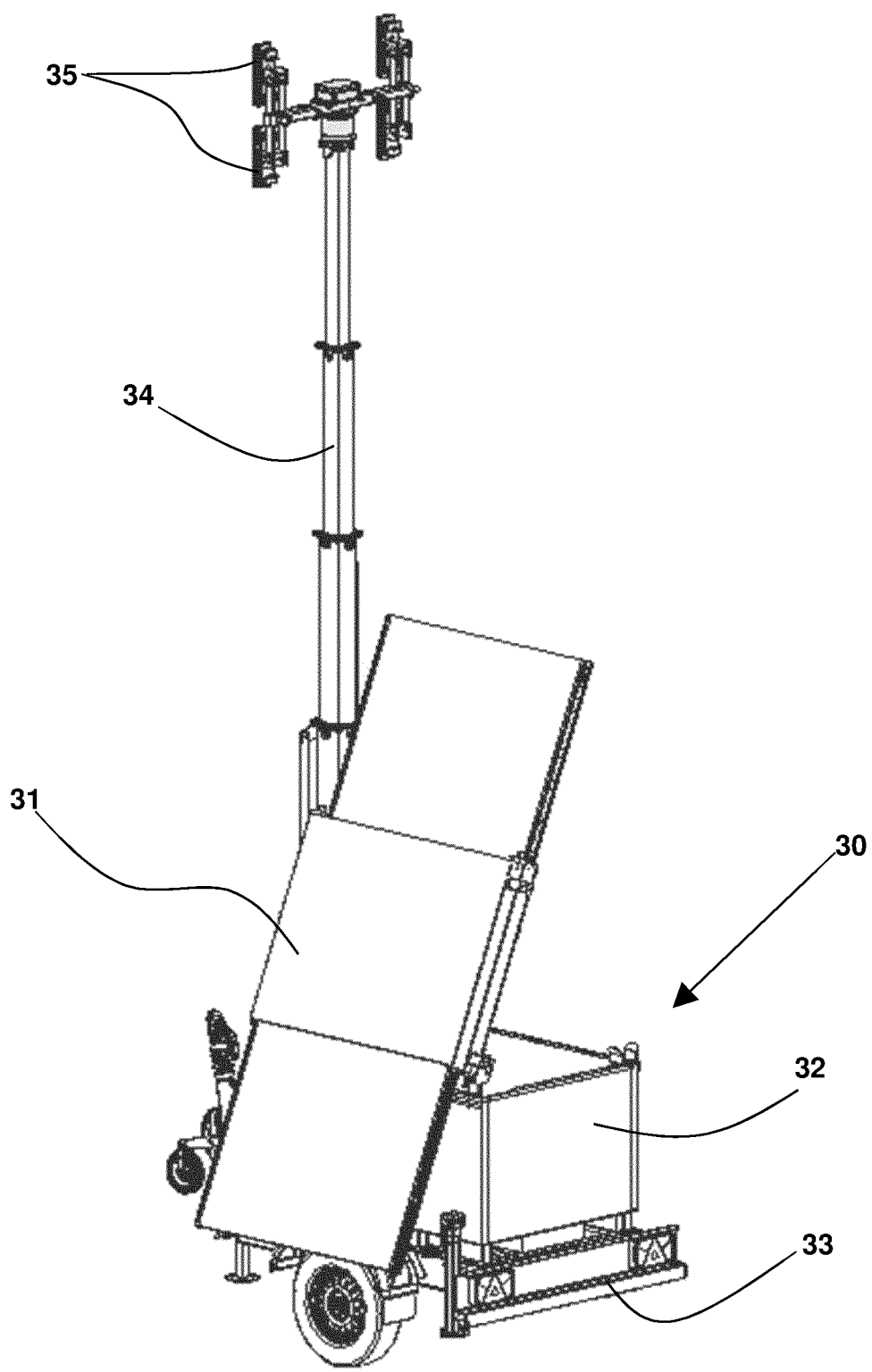
FIG. 4 shows a preferred embodiment of a solar powered off-grid floodlight assembly of the present invention.

FIG. 4 shows an example of such an arrangement, wherein the assembly 30 again comprises a battery housing 32 mounted on a trailer 33. In addition, a solar photovoltaic array 31 is also provided on the trailer 33. Advantageously the array 31 is arranged with a folding configuration so that the solar panels can be opened up when in use and then closed again for easy transport and storage during non-use.

As with the assembly shown in FIG. 3B, the lighting modules 35 are mounted on an extendable mast 34. It will be appreciated that various mechanisms can be employed to deliver the extension/retraction of the mast (e.g. manual or automatic). Also, in further alternative arrangements the mast may be fixed, although it is appreciated that such arrangement would require specialist operations for assembly.

It will be appreciated that for the any of the embodiments there must be a minimum of essential components forming the functional assembly to enable the functional assembly to achieve a functional objective. For example, a lighting module must be accompanied by at least an energy storage means to provide a function. Such essential components can be described as on-board components, irrespective of whether they are integrated into a single fixed assembly or take the form of individual modules that are assembled or connected together at the location where the functional objectives are to be provided.

Each of the off-grid assemblies shown in FIGS. 3A, 3B, and 4 are provided with processing means configured to implement the power management method of the present invention. The term "processing means" is used herein to refer to a computing device that is configured to implement any of the methods of power management disclosed herein. The processing means may comprise a processor (e.g., a hardware processor, such as a microprocessor or microcontroller) operably connected to a memory. The memory may comprise processor-executable instructions that, when executed by the processor, cause an off-grid assembly comprising the processor to perform any of the methods disclosed herein.

Preferably the processing means may be provided with an on-board user interface (i.e. keyboard and screen) to enable an operator to interact with the off-grid assembly. Alternatively, or possibly in addition, the processing means may be provided with a wireless communication means (e.g. mobile cellular network, Bluetooth, Wi-Fi, low-power wide-area network (LPWAN), or satellite connectivity facilities) that enable an operator to interact with the off-grid assembly, both on site and off site.

It is envisaged that the processing means are functionally connected to both the energy storage means and the functional components (e.g. lighting modules) of the off-grid assembly. Also, in those embodiments of the present invention where an energy source (e.g. solar photovoltaic array) is also provided, the processing means may also be functionally connected to the energy source too.

In this way the processing means, which comprises a computer program product that is executed to carry out the various steps required by the described power management method, enables the off-grid assemblies of the present invention to be operated more effectively in the field (i.e. in a remote location) with a reduced level of operator oversight.

During the operation of the off-grid assemblies of the present invention the processing means will preferably apply a twin approach to determine the current state of charge of the on-board energy storage means of the assembly.

As noted above, an on-board energy storage means includes both integrated arrangements (such as those shown in FIGS. 3A, 3B, and 4) and also arrangements where the energy storage means are provided in the form of a separate component that is connected to the assembly on-site.

It will be appreciated that providing the energy storage means as a separate component allows for them to be quickly swapped out and replaced, for example in situations where an alert has been issued to advise that the current charge in the energy storage means is insufficient to deliver a required output.

Providing the energy storage means as a separate component also allows them to be more easily transported to a required assembly location where the allowable weight and/or size of individual modules is limited, or where space considerations at the assembly location require flexibility of placement of components.

One specific application in which this modular construction is considered particularly beneficial is in off-grid floodlight assemblies that are deployed alongside railway tracks. The modular construction makes it easier to transport the assembly along the trackside and then set it up in the sometime limited space available alongside the track.

As described in detail above, the preferred twin approach employed by the off-grid assemblies of the present invention enables an accurate reading of the current state of charge of the energy storage means.

Using the current state of charge, and taking into account the level of power required to operate the on-board functional components of the off-grid assembly in accordance with the operator's requirements, the processing means devises a power rationing model that ensures at least partial functionality of the on-board functional components throughout the required operational period or periods.

In the preferred embodiments shown in FIGS. 3B and 4, which are both off-grid floodlight assemblies, the main functional components are lighting modules. As such, the processing means preferably also take into account the dusk (i.e. sunset) and dawn (i.e. sunrise) times for the locale in which the off-grid assembly is deployed.

This is beneficial because it avoids situations where power is unnecessarily allocated to running the lights during daylight hours, which in turn optimises the limited charge of the on-board energy storage means. Where integrated with an energy source e.g. such as an internal combustion engine powered generator, this will also minimise the requirement to activate and utilise this energy source.

It will be appreciated that other factors, such as operator's preferences, may also be taken into account in addition to the dusk/dawn times when determining the required operational/illumination period or periods to be serviced by the off-grid assembly.

It will be appreciated that a wide range of power rationing profiles could therefore be employed in operation of the off-grid assemblies of the present invention. Examples of a variety of preferred profiles are shown in FIG. 5 with reference to the maximum and minimum power levels required for the operation of the off-grid assembly's functional components.

The following power rationing profiles will now be described from the perspective of the operation of an off-grid floodlight assembly, in which the main functional components of the assembly are lighting modules (e.g. see FIGS. 3 and 4). However it will be appreciated that the profiles could also be used in association with other functional components, such as surveillance cameras, loudspeakers, sensors, display screens, power offtake facilities, and combinations thereof.

Turning now to FIG. 5, in the most basic embodiments, the profiles may simply comprise a flat reduction of the normal power supplied to a functional component, i.e. lighting module(s).

In the case of profile A the power supply is rationed to 90%, whereas profile B is 60% and profile C is 75%. In all three of these profiles the power supply is reduced for a single continuous period. In the case of profile D, however, the power supply is reduced to 50% over three distinct operation periods.

It is envisaged that the reduction in power supplied to the lighting modules of the off-grid floodlight assembly could result in all a uniform reduction in the level of light produced by each of the lighting modules. Alternatively, the power reduction could be accommodated by only turning on a portion of the lighting modules.

Both options are considered viable as they allow the off-grid assembly to continue to provide illumination for a required illumination period (i.e. A-C) or periods (D).

Although the flat power reductions provided by profiles A-D may be sufficient in a range of operations, some situations may call for more sophisticated power rationing profiles in which the level of power provided varies during the required lighting period. Profiles E-H and I-L represent examples of more sophisticated power rationing approaches.

Once again, it will be appreciated that the profiles may reduce the power levels for a single continuous period (e.g. profiles E-K) or for multiple periods (e.g. profile L).

It is envisioned that the power rationing profiles employed in the operation of the present invention may also comprise hybrid profiles formed by combining multiple profiles (such as those shown in FIG. 5) either within a given required operation/illumination period or over a series of such periods.

For example, in use, on a first night power rationing profile A could be employed. Then, in the absence of a recharging of the energy storage means (e.g. possibly due to inadequate solar energy being collected by the solar PV array of the assembly), on the second night profile B could be adopted to accommodate the reduced charge held by the energy storage means.

Following a period of higher solar irradiance on the third day, in which the energy storage means receive a suitable level of charging, power rationing profile C could be employed. However, if the solar irradiance levels on the third day are as bad as the second day, power rationing profile D could be employed instead to accommodate the further reduction in the charge held by the energy storage means.

As noted above, the off-grid assemblies of the present invention can be provided with combinations of different functional components, each of which is managed in accordance with the power management method described herein.

Figure 6:
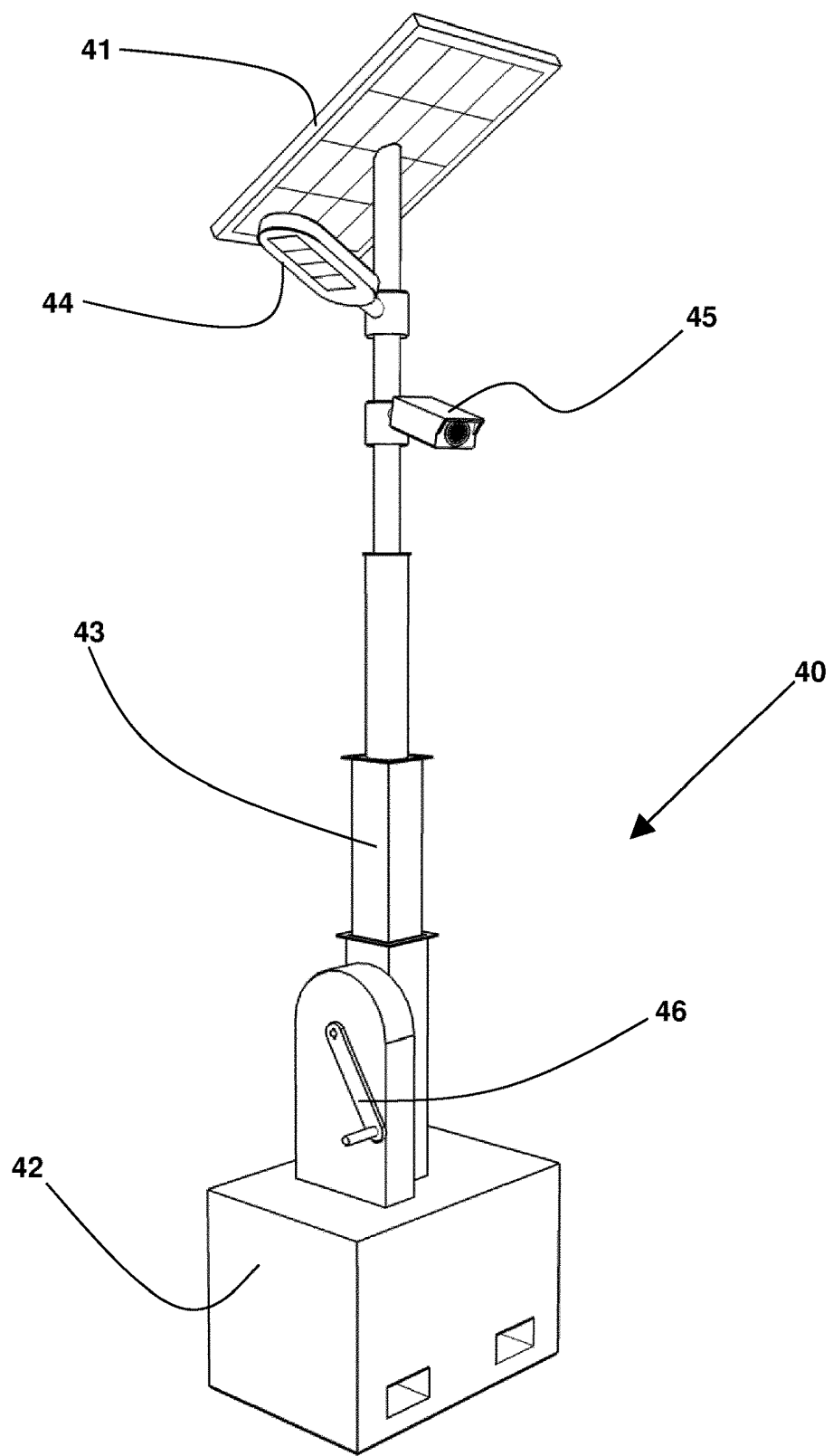
FIG. 6 shows a preferred embodiment of an off-grid assembly with multiple types of functional components.
Figure 7:
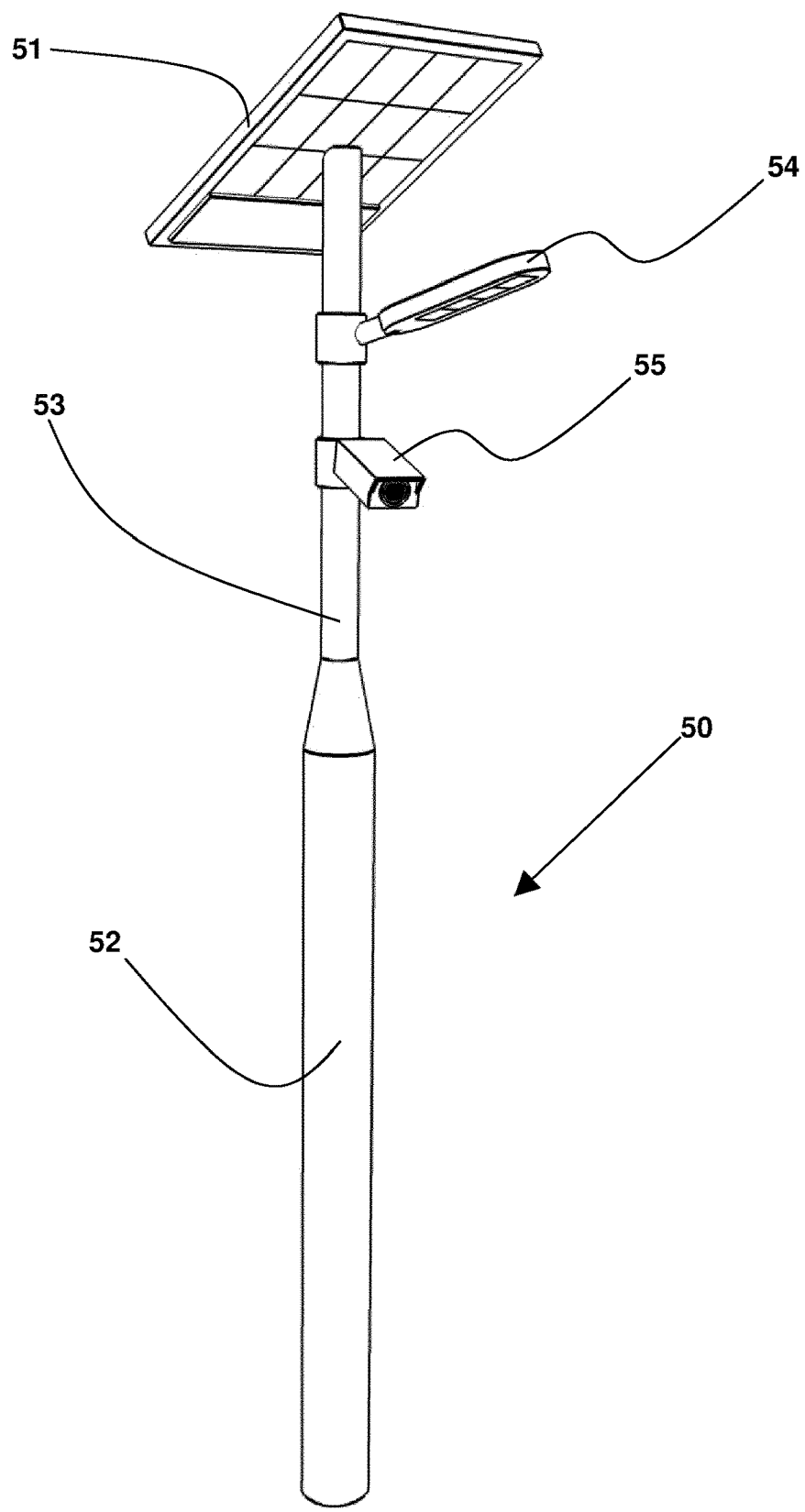
FIG. 7 shows an alternative embodiment of an off-grid assembly with multiple types of functional components.

By way of example, FIGS. 6 and 7 show two further embodiments of the off-grid assembly of the present invention. FIG. 6 shows an off-grid assembly 40 that combines the functional components of a lighting module 44 and a surveillance camera 45. Both the light and the camera are mounted on a mechanically extendable mast 43, which can be raised and lowered using a crank handle 46.

The mast 43 is provided on base unit 42, which may preferably house the energy storage means and the processing means that allow for the off-grid operation of the assembly 40. However in an alternative arrangement the energy storage means and the processing means may be integrated into or attached to other components. In addition, the assembly is also provided with a solar photovoltaic (PV) array 41 that is configured to re-charge the assembly's energy storage means.

The base unit 42 is preferably provided with slots that enable lifting equipment, such as a fork-lift truck, to relocate and position the assembly 40.

It will be appreciated that providing the energy storage means/batteries in the base unit 42 will help to stabilise the assembly, which is particularly important when the mast is extended. In those embodiments where the energy storage means/batteries are provided as a separate connected module, it is appreciated that alternative weighting means (e.g. a concrete infill) may be provided in the base unit to provide the required stability.

FIG. 7 shows a lamppost embodiment of the off-grid assembly of the present invention. As with the assembly 40 shown in FIG. 6, the lamppost 50 is provided with a solar PV array 51, a lighting module 54 and a surveillance camera 55.

Preferably the solar array, light and camera may be mounted on the upper portion 53 of the lamppost 50.

Also, preferably the energy storage means and the processing means may be provided within the lower portion 52 of the lamppost 50. Alternatively the energy storage means and the processing means may be provided within the solar PV array 51 or the lighting module 54.

Figure 8:
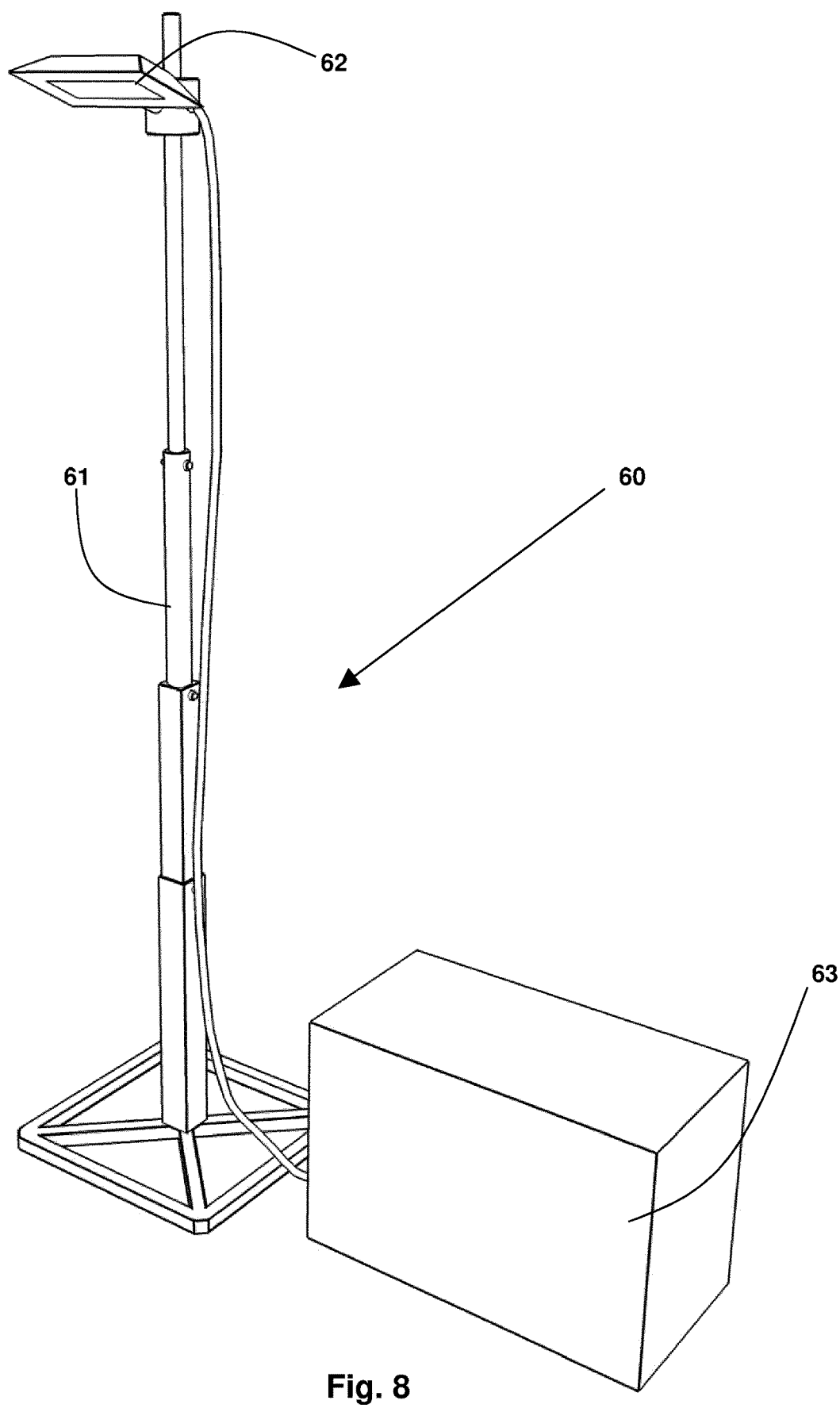
FIG. 8 shows a further alternative embodiment of an off-grid floodlight assembly with modular components.

FIG. 8 shows a further alternative embodiment of the off-grid floodlight assembly 60 of the present invention. In this embodiment the housing 63, in which the energy storage means and processing means may be held, is provided as a separate module to the lighting mast 61 and its associated lighting module 62. The benefits of providing the assembly 60 in the form of multiple inter-connectable modules are described hereinbefore.

Figure 9:
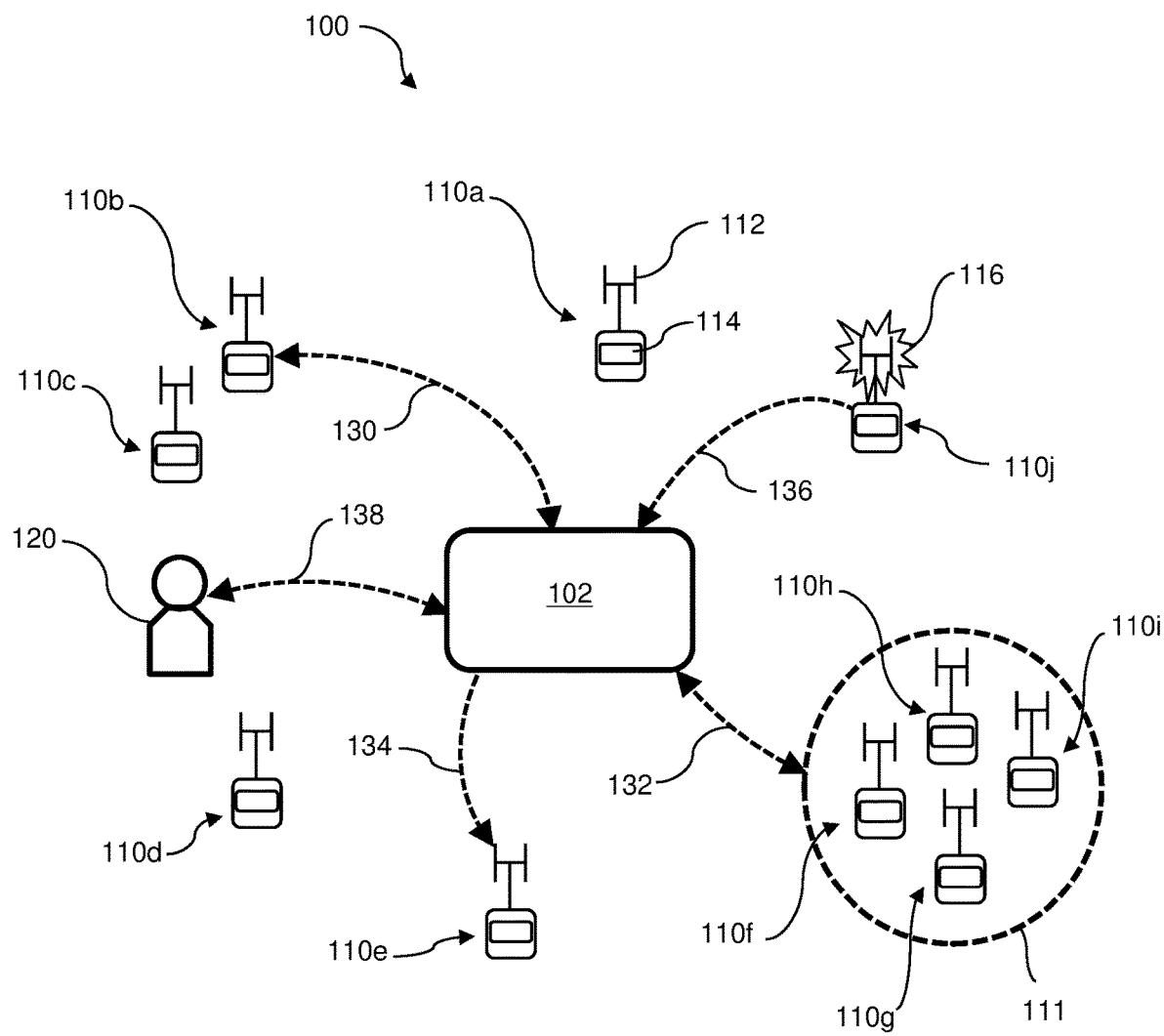
FIG. 9 shows a system for managing off-grid assemblies.

Turning to FIG. 9, a system 100 for managing a plurality of off-grid assemblies 110a-j is depicted. The system 100 comprises a server 102 that is in communication with one or more off-grid assemblies 110a-j. The server 102 may be configured to manage power levels in accordance with a power rationing model as described herein. Advantageously, this allows the management to be performed in a centralised manner, allowing for the management of a large number of off-grid assemblies simultaneously. Alternatively, the management of power levels in accordance with the power rationing model as described herein may be performed at the off-grid assemblies 110a-j themselves. Advantageously, this allows the off-grid assemblies 110a-j to manage power even when in remote locations as they are not reliant on a wireless communications link with the server 102. In such embodiments, the server 102 may be only in intermittent communication with each of the off-grid assemblies 110a-k. It will be appreciated that the number of off-grid assemblies 110a-j depicted in FIG. 9 is merely exemplary.

Each of the off-grid assemblies 110a-j comprises one or more functional components 112 and a communications unit 114 (as labelled on off-grid assembly 110a) for communicating with the server 102. It will be appreciated that the off-grid assemblies 110a-j may have any of the features, functions, or advantages of any of the off-grid assemblies (e.g. an off-grid floodlight assembly) described herein. Similarly, the functional components 112 may comprise any of the functional components described herein (e.g. a lighting module, a loudspeaker, a sensor). Similarly, the communications unit 114 may comprise a wireless communication means as described herein. In some embodiments, each of the off-grid assemblies 110a-j may further comprise a processing means configured to implement the power management method of the present invention.

As depicted in FIG. 9, at any one time, the server 102 may be in communication with one or more of the off-grid assemblies 110a-j. The communication may comprise one or more communication links. It will be noted that, while there is not a communication link depicted for all off-grid assemblies (e.g. off-grid assembly 110c) this simply means that the server 102 is not communicating with that off-grid assembly at that time. The server 102 may communicate with any of the off-grid assemblies 110a-j as required.

The communication links may comprise a two-way communication link 130 in which the server 102 and an off-grid assembly 110b share an exchange of data both in an uplink direction (i.e. from the off-grid assembly to the server) and in a downlink direction (i.e. from the server to the off-grid assembly.

Additionally or alternatively, the communication links may comprise a communication link 132 with a group 111 of off-grid assemblies 110f-i. In such communication links, the system may comprise a relay (not shown) or other similar arrangement that allows the server 102 to send a single message which is then distributed across the off-grid assemblies 110f-i within the group 111. For example, one of the off-grid assemblies 110f-i in the group may act as a relay off-grid assembly. The relay off-grid assembly may be the only off-grid assembly in the group that is in direct communication with the server 102. All, or only relevant, messages received by the relay off-grid assembly from the server 102 may be processed and/or forwarded to the other off-grid assemblies in the group.

The communication links may comprise a downlink communication link 134 in which the server 102 transmits messages to an off-grid assembly 110e. The messages may comprise instructions and/or data. The instructions may comprise instructions to adjust and/or override the power rationing model. The data may comprise data relevant to the power rationing model, such as daylight hours, local weather forecasts, or any other data described herein as being utilised by the power rationing model. Alternatively or additionally, some or all of the data may be determined locally at the off-grid assemblies 110a-j. For example, a processing means of the off-grid assembly 110a-j may be configured to calculate daylight hours of the region local to the particular off-grid assembly 110a-j.

The communication links may comprise an uplink communication link 136 in which an off-grid assembly 110j transmits messages to the server 102. The messages may comprise operational data such as battery levels, operating parameters (e.g. voltage, power), location, utility status, operational status of a solar photovoltaic array, runtime and/or other data described herein as being relevant to the operation of the off-grid assemblies. The server 102 may be configured to process the operational data to determine further operational information. For example, the server 102 may be able to process the battery level of an energy storage means to determine a remaining runtime of any functional components 112 reliant on the energy storage means.

The uplink communication link 136 may enable the server 102 to detect and/or generate an alert 116. The alert 116 may be generated by the off-grid assembly 110j and transmitted to the server 102. Alternatively or additionally, the alert 116 may be generated by the server 102 in response to a message received from the off-grid assembly 110j. The alert 116 may be generated (by either the server 102 or the off-grid assembly 110j) based on the operational data, for example, an alert 116 may be generated if uncharacteristic operating parameters are detected.

As depicted in FIG. 9, at any one time, the server 102 may be in communication with one or more external agents 120. The external agent 120 may comprise: a user of; a maintenance team for; a manufacturer of; a service provider for; and/or any other party with interest in the off-grid assemblies 110a-j. The communication with the external agent 120 may comprise one or more communication links 138. The communication links 138 may comprise a two-way communication link, an uplink communication link, and/or a downlink communication link as described herein.

The communication link 138 between the server 102 and the external agent 120 may allow the server 102 to send messages to the external agent 120. The messages may be receivable by the external agent 120 as an email, a Short Message Service (SMS) message, a notification on an application, a message on a management portal, and/or any other communication type known in the art. The messages may comprise data, information, and/or alerts. For example, responsive to detecting or generating the alert 116, the server 102 may transmit or forward the alert 116 to the external agent 120. For example, if a fault or unusual condition is detected (by either the server 102 or the off-grid assembly 110j) at the off-grid assembly 110j, an alert 116 may be generated (by either the server 102 or the off-grid assembly 110j) and a notification may be transmitted to the external agent 120. This may allow the external agent 120 to respond to the alert 116 (e.g. send a maintenance team or disconnect power from the off-grid assembly 110j).

The server 102 may be further configured to receive, process, and/or forward to the off-grid assemblies 110a-j instructions received from the external agent 120. For example, the external agent 120 may transmit an instruction (e.g. switch off functional components 112, rotate a solar photovoltaic array) to the server 102. The server 102 may further process this instruction or may forward the instruction directly to one or more of the off-grid assemblies 110a-j. For example, the server 102 may transmit instructions to a single off-grid assembly 130, a group 111 of off-grid assemblies 110f-i, or all off-grid assemblies 110a-j that can be in communication with the server 102.

To assist the external agent 120 in providing instructions to the off-grid assemblies 110a-j, the server 102 may be further configured to provide information to the external agent 120 in the form of a management portal. The management portal may provide an interface for the external agent 120 to provide instructions. The management portal may further display data about the off-grid assemblies 110a-i held at the server.

FIG. 10 illustrates an example view that may be available in the management portal. The view provides the external agent 120 with several different data types arranged into columns. Each of the data types are described below. It will be appreciated that the management portal may provide any combination of data to the external agent 120 based on any of the relevant data, information, or parameters described herein.

Asset An indicator or name for each off-grid assembly.

Last Seen An indication of when data was last received from or transmitted to each off-grid assembly.

Battery Level An indication of the remaining battery level of the energy storage means of each off-grid assembly. The battery level may comprise a percentage and/or remaining runtime.

Battery Voltage An indication of the voltage being provided by the energy storage means. The battery voltage may comprise the voltage currently being supplied by the energy storage means, or may be a particular extreme voltage (e.g. the lowest or highest voltage provided by the energy storage means within a predefined period).

Customer An indication of who owns, uses, or operates each off-grid assembly.

Location An indication of the location of each off-grid assembly. The location may be approximate (e.g. city/country) or precise (e.g. latitude & longitude). Alternatively or additionally, the management portal may also provide a map view that visually depicts the locations of the off-grid assemblies.

Utility Status An indication of whether the off-grid assembly (e.g. any of its functional components) are on or off. The indication may further include an indication of the operating power of the off-grid assembly. The indication may further comprise an indication of whether the off-grid assembly is switched on manually (i.e. "M") or using a timer (i.e. "T"), Panel Status An indication of a proportion of a solar photovoltaic array that is exposed for solar capture, the solar photovoltaic array being associated with the off-grid assembly.

Orientation An indication of the orientation of the solar photovoltaic array (e.g. an azimuth angle).

Runtime An indication of the estimated remaining runtime of the off-grid assembly. The estimated remaining runtime may be calculated with reference to a timing schedule (e.g. the off-grid assembly should be powered from Dusk-Dawn for 7 nights, or for 2 hours per night, or weekends only). The indication may comprise one or more estimated remaining runtimes based on one or more assumed operating powers.

The management portal may also allow the external agent 120 to set and/or modify one or more timers for the off-grid assemblies 110*a-j*. For example, a timer schedule may be defined which determines time periods in which the off-grid assembly (e.g. its functional components 112) should be 'on' or 'off'. In particular, the time schedule may determine time periods in which the off-grid assembly is able to be switched 'on'. The timer schedule may be defined by specific times (e.g. 19:00 or 7:00 am) or may be defined relative to dusk or dawn (e.g. 'Dawn' or 'Dusk+60 mins'). The management portal may also provide the external agent 120 with manual control over the off-grid assemblies 110*a-j* (i.e. the ability to switch on/off the off-grid assemblies 110*a-j* independently of the time of day).

Figure 11:
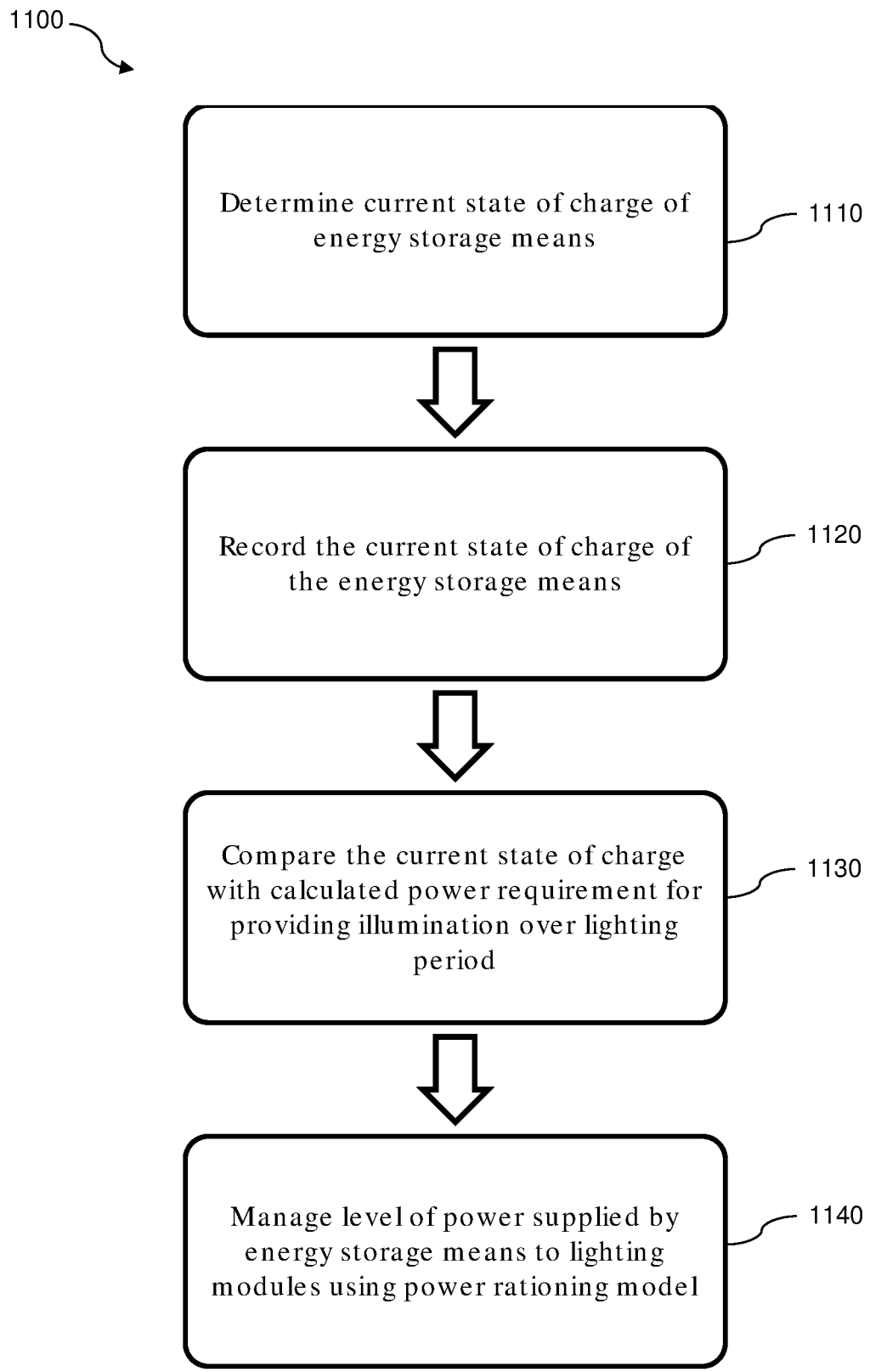
FIG. 11 is a flow diagram of an example method of managing the power requirements of an off-grid floodlight assembly that has one or more lighting modules powered by energy storage means.

Turning to FIG. 11, a flow diagram is shown of an example method 1100 of managing the power requirements of an off-grid floodlight assembly that has one or more lighting modules powered by energy storage means. The method 1100 comprises determining 1110 a current state of charge of the energy storage means. The determining 1110 may comprise (i) observing a stabilisation period following a change in charge supply and/or charge demand experienced by the energy storage means before measuring the voltage and load power of the energy storage means and said light modules respectively and using the stabilised measurements taken to determine the state of charge of the energy storage means. Alternatively, the determining 1110 may comprise (ii) using the difference between charge input and charge output of the energy storage means to calculate any change in the state of charge since the state of charge was last determined using stabilised measurements in accordance with step (i) to determine the state of charge of the energy storage means.

The method 1100 further comprises recording 1120 the current state of charge of the energy storage means.

The method 1100 further comprises comparing 1130 the current state of charge determined in determination 1110 with a calculated power requirement for providing illumination over at least one required lighting period, wherein said required lighting period is determined taking into account the prevailing dawn and dusk times for the region in which the off-grid floodlight assembly is deployed.

The method 1100 further comprises managing 1140 the level of power supplied by the energy storage means to the lighting modules in accordance with a power rationing model, wherein said power rationing model comprises instructions to vary the power supplied over time to ensure delivery of illumination throughout the required lighting period or periods.

Figure 12:
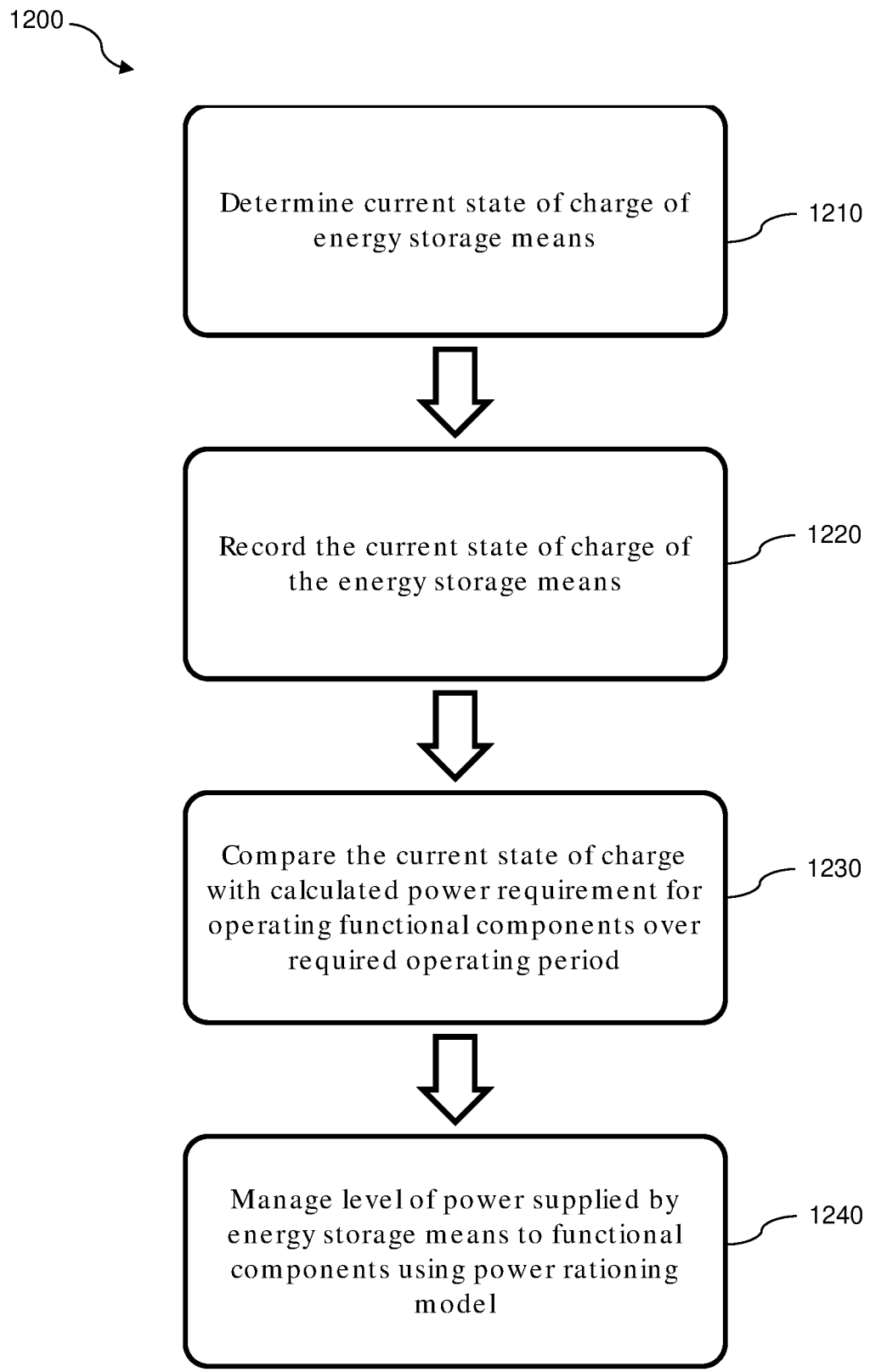
FIG. 12 is a flow diagram of an example method of managing the power requirements of an off-grid assembly that has one or more functional components with electrical power demands that are met by energy storage means.

Turning to FIG. 12, a flow diagram is shown of an example method 1200 of managing the power requirements of an off-grid assembly that has one or more functional components with electrical power demands that are met by energy storage means. The method 1200 comprises determining 1210 the current state of charge of the energy storage means. The method 1200 further comprises recording 1220 the current state of charge of the energy storage means.

The method 1200 further comprises comparing 1230 the current state of charge determined in determination 1210 with a calculated power requirement for operating said functional components for at least one required operating period.

The method 1200 further comprises managing 1240 the level of power supplied by the energy storage means to the functional components in accordance with a power rationing model that comprises instructions to vary the power supplied over time to ensure at least partial functionality of the functional components throughout the required operating period or periods.

The invention claimed is:

1. A method of managing the power requirements of an off-grid floodlight assembly that has one or more light modules powered by an energy storage device, said method comprising:
   a) determining the current state of charge of the energy storage device and recording such, where the state of charge is determined by either:
      i) following a change in charge supply and/or charge demand experienced by the energy storage device, waiting for a voltage of the energy storage device to stabilise before measuring both the voltage of the energy storage device and a load power of the light modules while the light modules are applying a load to the energy storage device, and using the stabilised measurements taken to determine the state of charge of the energy storage device; or
      ii) using the difference between charge input and charge output of the energy storage device to calculate any change in the state of charge since the state of charge was last determined using stabilised measurements in accordance with step i) to determine the state of charge of the energy storage device;

b) comparing the current state of charge determined in step a) with a calculated power requirement for providing illumination over at least one required lighting period, wherein said required lighting period is determined taking into account the prevailing dawn and dusk times for the region in which the off-grid floodlight assembly is deployed;

c) managing the level of power supplied by the energy storage device to the light modules in accordance with a power rationing model, wherein said power rationing model comprises instructions to vary the power supplied over time to ensure delivery of illumination throughout the required lighting period or periods.

2. The method of claim 1, wherein the power management instructions of the power rationing model are pre-programmed to increase and decrease the brightness of the light provided by the light modules at pre-determined points during said required lighting period.

3. The method of claim 2, wherein the power management instructions comprise a power supply profile with a bell curve shaped distribution, wherein the bell curve is inverted so that the power supplied during the required lighting period initially falls before rising again.

4. The method of claim 3, wherein the extremum of the bell curve:
a) corresponds to a temporal midpoint between the prevailing dawn and dusk times for the region in which the off-grid floodlight assembly is deployed; or b) is offset from the temporal midpoint between the prevailing dawn and dusk times for the region in which the off-grid floodlight assembly is deployed.

5. The method of claim 1, wherein the power management instructions of the power rationing model are calculated with reference to the prevailing dawn and dusk times for the region in which the off-grid floodlight assembly is deployed.

6. The method of claim 1, wherein the power rationing model utilises historical electrical charge levels collected from the energy storage device to identity charge trends that can be used to help modulate the level of power supplied to the light modules during the required lighting period.

7. The method of claim 1, wherein the off-grid floodlight assembly is a solar powered off-grid light assembly that is recharged by a photovoltaic array, and
wherein the power rationing model utilises historical solar irradiance data for the region in which the solar powered off-grid floodlight assembly is deployed to identity charge trends that can be used to help modulate the level of power supplied to the light modules during the required lighting period.

8. The method of claim 7, wherein the power rationing model utilises forecast weather or solar irradiance data for the region in which the solar powered off-grid floodlight assembly is deployed to identity charge trends that can be used to help modulate the level of power supplied to the light modules during the required lighting period.

9. The method of claim 1, said method further comprising retrieving the data required to manage the power requirements of the assembly from either an on-board memory system or from a remote memory system using a wireless network connection; and wherein the retrieved data consists of prevailing dawn/dusk times, historical electrical charge levels, historical solar irradiance levels, and combinations thereof.

10. The method of claim 1, said method further comprising using a wireless network connection to retrieve forecast weather or solar irradiance data for the region in which the off-grid floodlight assembly is deployed.

11. The method of claim 1, said method further comprising setting a minimum level of illumination that is to be delivered throughout the required lighting period.

12. The method of claim 11, wherein an alert is issued when the determined level of charge in the energy storage device is insufficient to ensure delivery of the set minimum level of illumination throughout the required lighting period.

13. An off-grid floodlight assembly, comprising one or more light modules, an energy storage device, and processing device configured to:

a) determine the current state of charge of the energy storage device and record such, where the state of charge is determined by either:
i) following a change in charge supply and/or charge demand experienced by the energy storage device, waiting for a voltage of the energy storage device to stabilize before measuring both the voltage of the energy storage device and a load power of the light modules while the light modules are applying a load to the energy storage device, and using the stabilised measurements taken to determine the state of charge of the energy storage device; or
ii) using the difference between charge input and charge output of the energy storage device to calculate any change in the state of charge since the state of charge was last determined using stabilised measurements in accordance with step i) to determine the state of charge of the energy storage device;

b) compare the current state of charge determined in step a) with a calculated power requirement for providing illumination over at least one required lighting period, wherein said required lighting period is determined taking into account the prevailing dawn and dusk times for the region in which the off-grid floodlight assembly is deployed;

c) manage the level of power supplied by the energy storage device to the light modules in accordance with a power rationing model, wherein said power rationing model comprises instructions to vary the power supplied over time to ensure delivery of illumination throughout the required lighting period or periods.

14. The off-grid floodlight assembly of claim 13, wherein the assembly further comprises a solar photovoltaic array that is connected to the energy storage device so that solar energy can be used to charge the energy storage device.

15. A method of managing the power requirements of an off-grid assembly that has one or more functional components with electrical power demands that are met by an energy storage device, said method comprising:

a) determining the current state of charge of the energy storage device and recording such, where the state of charge is determined by either:
i) following a change in charge supply and/or charge demand experienced by the energy storage device, waiting for a voltage of the energy storage device to stabilise before measuring both the voltage of the energy storage device and a load power of the functional components while the functional components are applying a load to the energy storage device, and using the stabilised measurements taken to determine the state of charge of the energy storage device; or ii) using the difference between charge input and charge output of the energy storage device to calculate any change in the state of charge since the state of charge was last determined using stabilised measurements in accordance with step i) to determine the state of charge of the energy storage device;

b) comparing the current state of charge determined in step a) with a calculated power requirement for operating said functional components for at least one required operating period;

c) managing the level of power supplied by the energy storage device to the functional components in accordance with a power rationing model that comprises instructions to vary the power supplied over time to ensure at least partial functionality of the functional components throughout the required operating period or periods.

16. The method of claim 15, wherein said functional components are selected from a list that consists of: at least one light module; at least one surveillance camera; at least one loudspeaker; at least one sensor; at least one display screen; at least one power offtake facility; and combinations thereof.

17. An off-grid assembly, comprising one or more functional components, an energy storage device, and processing device adapted to:

a) determine the current state of charge of the energy storage device and record such, where the state of charge is determined by either:

i) following a change in charge supply and/or charge demand experienced by the energy storage device, waiting for a voltage of the energy storage device to stabilise before measuring both the voltage of the energy storage device and a load power of the functional components while the functional components are applying a load to the energy storage device, and using the stabilised measurements taken to determine the state of charge of the energy storage device; or ii) using the difference between charge input and charge output of the energy storage device to calculate any change in the state of charge since the state of charge was last determined using stabilised measurements in accordance with step i) to determine the state of charge of the energy storage device;

b) compare the current state of charge determined in step a) with a calculated power requirement for operating said functional components for at least one required operating period;

c) manage the level of power supplied by the energy storage device to the functional components in accordance with a power rationing model that comprises instructions to vary the power supplied over time to ensure at least partial functionality of the functional components throughout the required operating period or periods.

18. The off-grid assembly of claim 17, wherein said functional components are selected from a list that consists of: at least one light module; at least one surveillance camera; at least one loudspeaker; at least one sensor; at least one display screen; at least one power offtake facility; and combinations thereof.

19. The off-grid assembly of claim 17, wherein the assembly further comprises an energy source configured to charge the energy storage device, said energy source selected from a list that consists of: a solar photovoltaic array; an internal combustion engine powered generator; fuel cells; a wind turbine; other energy storage device; and combinations thereof.

* * * * *